United States Patent
Ramsay et al.

(10) Patent No.: US 12,293,742 B2
(45) Date of Patent: May 6, 2025

(54) SENSOR DATA VISUALIZATION AND RELATED SYSTEMS AND METHODS

(71) Applicant: LYTT LIMITED, Middlesex (GB)

(72) Inventors: James Crofton Ramsay, London (GB); Pradyumna Thiruvenkatanathan, London (GB)

(73) Assignee: LYTT LIMITED, Middlesex (GB)

( * ) Notice: Subject to any disclaimer, the term of this patent is extended or adjusted under 35 U.S.C. 154(b) by 0 days.

(21) Appl. No.: 18/022,954

(22) PCT Filed: Sep. 4, 2020

(86) PCT No.: PCT/EP2020/074875
§ 371 (c)(1),
(2) Date: Feb. 23, 2023

(87) PCT Pub. No.: WO2022/048778
PCT Pub. Date: Mar. 10, 2022

(65) Prior Publication Data
US 2024/0029688 A1  Jan. 25, 2024

(51) Int. Cl.
*G09G 5/10* (2006.01)
*G09G 5/391* (2006.01)

(52) U.S. Cl.
CPC ..... *G09G 5/391* (2013.01); *G09G 2340/0407* (2013.01)

(58) Field of Classification Search
CPC ........................ G09G 5/391; G09G 2340/0407
USPC ......................................................... 345/698
See application file for complete search history.

(56) References Cited

U.S. PATENT DOCUMENTS

| 5,801,688 A | 9/1998 | Mead et al. |
| 10,580,175 B2 * | 3/2020 | de Waele ............... G06T 11/206 |
| 2016/0005198 A1 * | 1/2016 | Penumatcha ......... G06T 11/001 345/589 |
| 2016/0063743 A1 * | 3/2016 | Ho ......................... G06T 11/206 345/440 |

(Continued)

FOREIGN PATENT DOCUMENTS

| JP | H0519032 A | 1/1993 |
| JP | 2013137444 | * 7/2013 ............... G09G 5/36 |
| JP | 2013137444 A | 7/2013 |

OTHER PUBLICATIONS

PCT/EP2020/074875 International Search Report and Written Opinion dated May 27, 2021 (3239-10800) (14 p.).

(Continued)

*Primary Examiner* — Jennifer T Nguyen
(74) *Attorney, Agent, or Firm* — CONLEY ROSE, P.C.

(57) ABSTRACT

A method of presenting sensor data can include receiving a request for data to be displayed on a display area of a display device, determining a data distribution per pixel within the display area for both the first axis and the second axis based on the pixel resolution, the first output range, and the second output range, fitting the data distribution per pixel for data associated with the first axis to provide first axis fitted data, fitting the data distribution per pixel for data associated with the second axis to provide second axis fitted data, and sending the first axis fitted data and the second axis fitted data. The request comprises a pixel resolution of the display area, a first output range of the data along a first axis, and a second output range of the data along a second axis.

24 Claims, 10 Drawing Sheets

(56) References Cited

U.S. PATENT DOCUMENTS

2019/0034526 A1    1/2019    Patil et al.

OTHER PUBLICATIONS

Sager, Rajiv et al., "Predicting Temperature Profiles in a Flowing Well," Society of Petroleum Engineers, vol. 6, No. 4 (SPE-19702-PA), Nov. 1, 1991 (3239-10800) (8 p.).

* cited by examiner

SENSOR DATA VISUALIZATION AND RELATED SYSTEMS AND METHODS

CROSS-REFERENCE TO RELATED APPLICATIONS

This application is a 35 U.S.C. § 371 national stage application of PCT/EP2020/074875 filed Sep. 4, 2020 and entitled "Sensor Data Visualization and Related Systems and Methods," which is hereby incorporated herein by reference in its entirety for all purposes.

STATEMENT REGARDING FEDERALLY SPONSORED RESEARCH OR DEVELOPMENT

Not applicable.

BACKGROUND

Data-driven analysis that involves large volumes of inter-related information is common across a variety of industries and situations. In some instances, an environment (e.g., such as an area, equipment, structure(s), system(s), etc.) may be monitored by one or more sensors or sensing systems and devices. Such devices output tremendous amounts of data that must be captured, organized, and presented in such a fashion that allows users and/or computing systems to draw inferences and make conclusions about the environment in question. In many instances, the volume of data that may be stored and/or transmitted between node points of a system is constrained by the available communication bandwidth therebetween, which further frustrates any effort to effectively view, manipulate, and present data for measurement and monitoring purposes.

SUMMARY

In some aspects, a method of presenting sensor data comprises receiving, with a server, a request for data to be displayed on a display area of a display device, determining a data distribution per pixel within the display area for both the first axis and the second axis based on the pixel resolution, the first output range, and the second output range, fitting, with the server, the data distribution per pixel for data associated with the first axis to provide first axis fitted data, fitting, with the server, the data distribution per pixel for data associated with the second axis to provide second axis fitted data, and sending, from the server to the display device, the first axis fitted data and the second axis fitted data. The request comprises a pixel resolution of the display area, a first output range of the data along a first axis, and a second output range of the data along a second axis.

In some aspects, a system for presenting sensor data on a display device comprises: a processor, a memory communicatively coupled to the processor, and an analysis program stored in the memory. The analysis program is configured, when executed on the processor, to: receive a request for data to be displayed on a display area of the display device, determine a data distribution per pixel within the display area for both the first axis and the second axis based on the pixel resolution, the first output range, and the second output range, fit the data distribution per pixel for data associated with the first axis to provide first axis fitted data, fit the data distribution per pixel for data associated with the second axis to provide second axis fitted data, and send the first axis fitted data and the second axis fitted data to the display device. The request comprises a pixel resolution of the display area, a first output range of the data along a first axis, and a second output range of the data along a second axis.

In some aspects, a method of presenting sensor data comprises: receiving, with a server, a request to display time-variable data on a plot presented on a display device, determining a data distribution per pixel within the plot for the axis based on the first pixel resolution and the output range, fitting, with the server, the data distribution per pixel along the axis to provide fitted data, determining a communication bandwidth between the server and the display device, combining adjacent pixels within the plot to produce adjusted fitted data along the axis based on the communication bandwidth, wherein the adjusted fitted data has a second pixel resolution that is lower than the first pixel resolution, and sending, from the server to a display device, the adjusted fitted data at the second pixel resolution. The request comprises a first pixel resolution of the display device, an identification of the data to be displayed along an axis of the plot, and an output range of the data along the axis.

In an aspect, a system for presenting sensor data comprises: a processor, a memory communicatively coupled to the processor, and analysis program stored in the memory. The analysis program is configured, when executed on the processor, to: receive a request to display time-variable data on a plot presented on a display device, determine a data distribution per pixel within the plot for the axis based on the first pixel resolution and the output range, fit the data distribution per pixel along the axis to provide fitted data, determine a communication bandwidth between the processor and the display device, combine adjacent pixels within the plot to produce adjusted fitted data along the axis based on the communication bandwidth, wherein the adjusted fitted data has a second pixel resolution that is lower than the first pixel resolution, and send the adjusted fitted data at the second pixel resolution to the display device. The request comprises a first pixel resolution of the display device, an identification of the data to be displayed along an axis of the plot, and an output range of the data along the axis;

In an aspect, a method for identifying an event comprises: providing sensor data, wherein the sensor data comprises measurements correlated with at least one of location or time, determining a first range for at least one of the location or the time, determining a first value of the measurements over the first range for at least one of the location or the time, determining a second range for at least one of the location or time, determining a second value of the measurements over the second range for at least one of the location or the time, determining a difference between the first value and the second value, and identifying an event for at the at least one of the location or the time using the difference.

In an aspect, a system comprises: a processor, a memory communicatively coupled to the processor, and an analysis program stored in the memory. The analysis program is configured, when executed on the processor, to: provide sensor data, wherein the sensor data comprises measurements correlated with at least one of location or time, determine a first range for at least one of the location or the time, determine a first value of the measurements over the first range for at least one of the location or the time, determine a second range for at least one of the location or time, determine a second value of the measurements over the second range for at least one of the location or the time, determine a difference between the first value and the second value, and identify an event for at the at least one of the location or the time using the difference.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
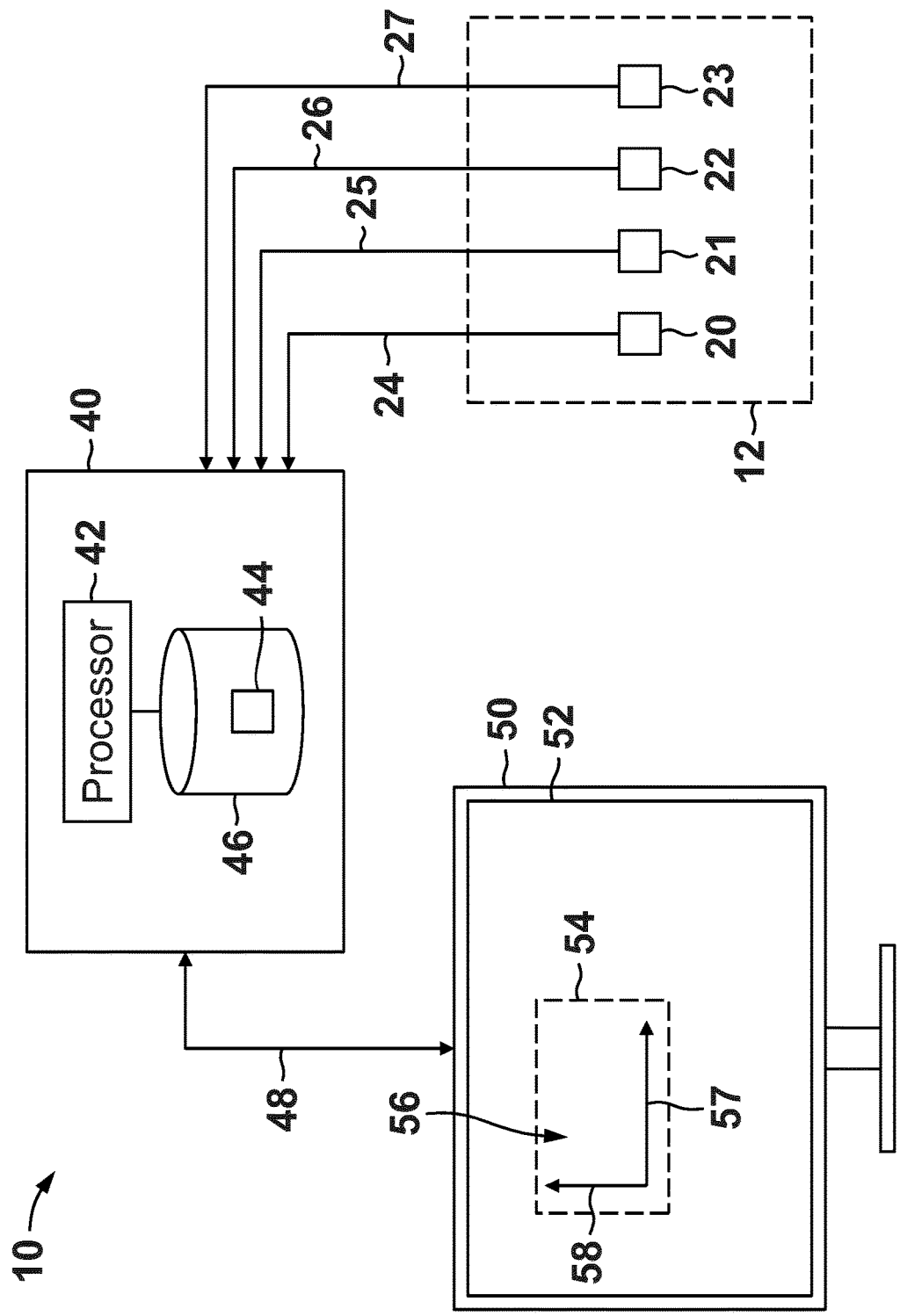
FIG. 1 is a schematic diagram of a system for presenting system data according to some embodiments disclosed herein.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%. Reference to up or down will be made for purposes of description with "up," "upper," "upward," "upstream," or "above" meaning toward the surface of the wellbore and with "down," "lower," "downward," "downstream," or "below" meaning toward the terminal end of the well, regardless of the wellbore orientation.

As previously described above, an environment may be monitored by one or more sensors or sensing systems and devices for purposes of detecting and/or monitoring for anomalies or events within the environment in question. In many cases, the raw (or even processed) data output from the sensing systems may include large volumes of information. Moreover, data that may best be considered together for a user to draw useful insights may not be correlated or related in such a manner to make any direct comparisons possible. Accordingly, embodiments disclosed herein include systems and methods for storing, organizing, correlating, and presenting data obtained for an environment such that a user (and/or computing system) may efficiently draw useful conclusions and insights about the environment in question. Thus, through use of the systems and methods disclosed herein, actionable insights may be gained from voluminous, interrelated data associated with an environment in a faster and more efficient manner.

As used herein an "environment," may comprise a location, area, system, device, components, etc. that may be subject to measurement or monitoring by one or more sensors or sensing devices/systems. For example, in some embodiments an environment in question may comprise a subterranean wellbore, and a plurality of sensors or sensor arrays may be coupled to or inserted within the wellbore in order to measure or detect various physical properties, variables, parameters, etc. For instance, in some embodiments, sensors for measuring temperature, pressure, acoustic signals, salinity, flow rate, etc. may be placed within the wellbore so as to provide a plurality of data streams for assessing the various events, conditions, etc. within the wellbore (e.g., such as fluid inflow, sand influx, fluid outflow, etc.) and possibly within the surrounding subterranean formation. In some embodiments, the one or more of the sensors may comprise a fiber optic cable inserted within the wellbore that is configured to operate as a distributed acoustic sensor (DAS) and/or a distributed temperature sensor (DTS).

In some embodiments the environment in question may comprise a transportation device, such as a train. In these embodiments, various data that may be captured about the transportation device may comprise sensor data associated with one or more wheels on the train (e.g., strain, vibration, acoustic, temperature, pressure, etc.). In some examples, the environment may comprise a premises being monitored for security purposes, and the data that may be captured can include various measurements such as visual observations, vibrations, acoustics, thermal imaging, optical sensors, position sensors, and the like. In still another example, the environment in question may comprise the body of a patient. In these situations, data that may be captured (e.g., by a doctor or other suitable personnel) may comprise various observations, measurements, and/or lab data obtained during a course of treatment for the patient (e.g., height, weight, blood pressure, heart rate, blood-oxygen levels, liver function, etc.).

In all of these example embodiments above, the collected data may (if correlated and processed properly) may provide an indication of various events or conditions within the environment of interest. The systems and methods disclosed herein may allow simple and effective correlation, interrelation, and presentation of voluminous data that may be obtained from an environment so as to assist a user in drawing useful insights regarding the environment in question.

Referring now to FIG. 1, a system 10 for presenting system data according to some embodiments is shown. Generally speaking, system 10 includes a plurality of sensors 20, 21, 22, 23 to measure one or more parameters or aspects of an environment 12, a computing device 40, and a display device 50.

In some embodiments, the environment 12 may comprise a subterranean wellbore, a manufacturing facility, a transportation device (e.g., a train), the body of a patient, etc., and the sensors 20, 21, 22, 23 may measure or detect one or more parameters associated with the environment 12, such as, for instance, pressure, temperature, strain, acoustic energy, vibration, light, heart rate, blood pressure, etc. As an example, one or more of the sensors 20, 21, 22, 23 can be associated with a wellbore to allow for monitoring of the wellbore during production of hydrocarbon fluids to the surface. In this example, the sensors 20, 21, 22, 23 can include temperature sensors, pressure sensors, vibration sensors, acoustic sensors, and the like.

Figure 2:
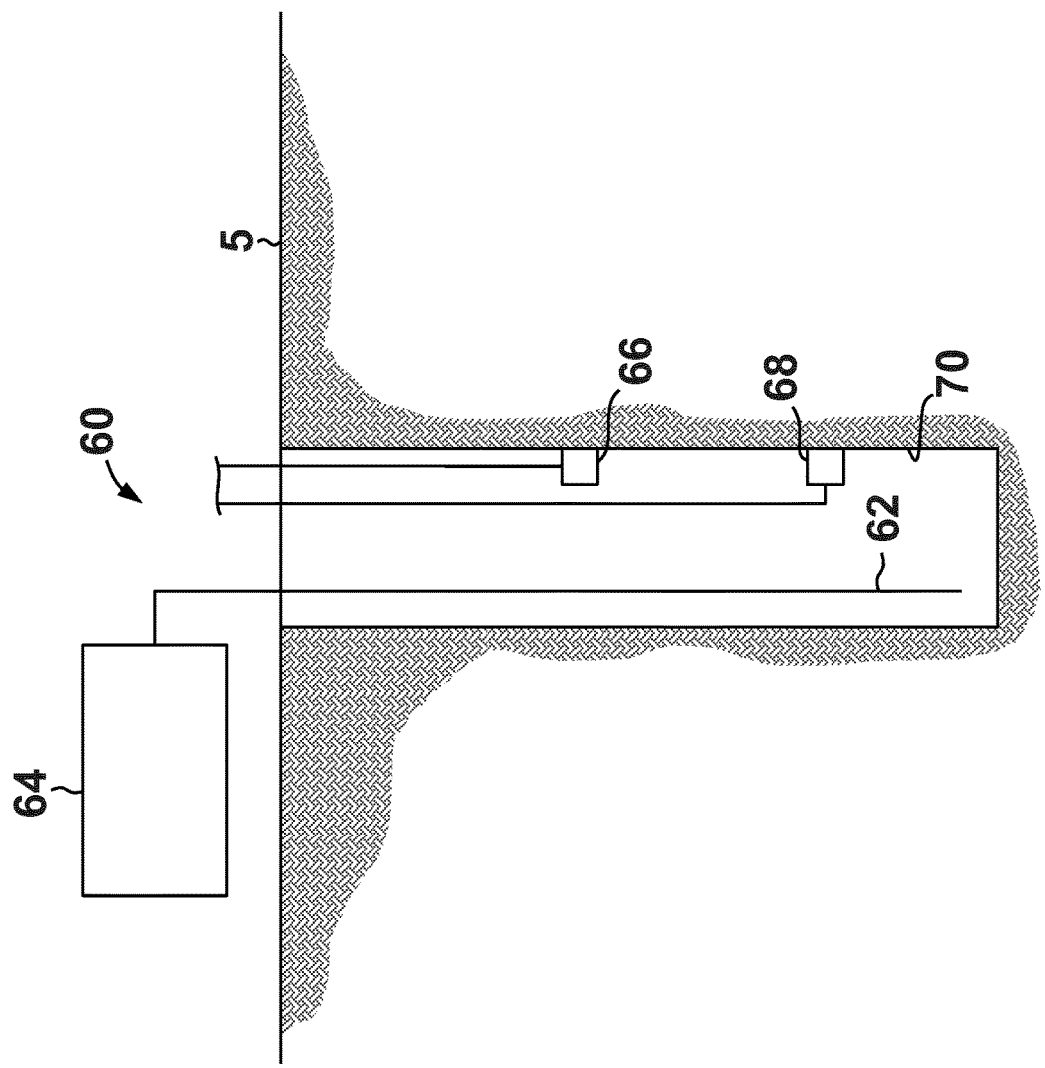
FIG. 2 is a schematic depiction of a wellbore environment that may be monitored using the system of FIG. 1 according to some embodiments disclosed herein.

Referring briefly now to FIG. 2, in some embodiments, one or more of the sensors 20, 21, 22, 23 may comprise a fiber optic measurement system 60 that comprises a fiber optic cable 62. In some embodiments (e.g., such as the embodiment of FIG. 2), the fiber optic cable 62 may be inserted within a subterranean wellbore 70. An interrogator 64 may be coupled to one end of the optical fiber 62 that is disposed at or near the surface 5. During operations, interrogator 64 may generate light (e.g., one or more light pulses), and then collect and analyze the backscattered light returning up the optical fiber 62. The measurement system 60 can be used for detecting a variety of parameters and/or disturbances in the wellbore 70 including being used to detect temperatures along the wellbore 70, acoustic signals along the wellbore 70, static strain and/or pressure along the wellbore 70, or any combination thereof.

For instance, in some embodiments the fiber optic measurement system 60 may be configured to detect acoustic signals along the wellbore 70, and therefore may form a distributed acoustic sensor (DAS). In some embodiments, the fiber optic measurement system 60 may be configured to detect temperatures along the wellbore, and therefore may form a distributed temperature sensor (DTS). In some embodiments, fiber optic measurement system 60 may be configured as both a DAS and a DTS (e.g., fiber optic cable 62 may comprise multiple fiber optic sensors, and/or interrogator 64 may comprise or be coupled to a suitable multiplexing device in order to selectively sample output from the fiber optic cable 62 for purposes of DAS signals or DTS signals.

Referring still to FIG. 2, in some embodiments, additional sensors 66, 68 may be installed within the wellbore 70 so as to measure various other parameters and values. For instance, additional sensors 66, 68 may be configured to measure any one or more of pressure, temperature, flow rate, salinity, pH, strain, acoustics (e.g., a point sensor, etc.), etc. In some embodiments, the fiber optic measurement system 60 may represent one or more of the sensors 20, 21, 22, 23 in the system 10 of FIG. 1, and the additional sensors 66, 68 may represent others of the sensors 20, 21, 22, 23 in the system of FIG. 1. Utilizing the fiber optic measurement system 60 (and, in some embodiments, the additional sensors 66, 68), various conditions and events within the wellbore 70 may be detected, tracked, and characterized, such as, for instance, fluid inflows/outflows, sand inflows, equipment failures (e.g., packer failures), micro seismic events, etc.

In some embodiments, one or more of the sensors 20, 21, 22, 23 may comprise sensors that are used for a specified period of time, and then are removed and no longer collect data. For instance, in some embodiments, one or more of the sensors 20, 21, 22, 23 may comprise logging tools that are traversed through the wellbore 70 to measure or detect various properties of the wellbore 70 and/or the surrounding subterranean formation (e.g., permeability, water content, porosity, etc.).

In some embodiments, the sensors 20, 21, 22, 23 may include various biophysical measurements (e.g., heart rate, body temperature, blood pressure, liver function, brain function, etc.) within the body of a patient (which may comprise the "environment."). These various measurements may be aimed at identifying and/or characterizing various "events" within the patient's body that may comprise various medical conditions or diseases. In some embodiments, the sensors 20, 21, 22, 23 may include various sensors for monitoring a component or components of a transportation device (e.g., such as a train as previously described above), so as to provide an indication of various events (e.g., equipment failures). In some embodiments, the sensors 20, 21, 22, 23 may include various other sensors within a manufacturing facility to provide indications of equipment failures, security breaches, etc. Thus, while many of the specific embodiments described herein relate to a subterranean wellbore as the environment (e.g., the wellbore 70 in FIG. 2), it should be appreciated that this is only one of many potential uses of the systems and methods described herein.

Referring again to FIG. 1, during operations, sensor data may be obtained from the sensors 20, 21, 22, 23 and communicated to the computing device 40 via communication pathways 24, 25, 26, 27, respectively. Communication pathways 24, 25, 26, 27 may comprise any suitable wired communication medium (e.g., metallic wire, fiber optic line, etc.) or wireless communication medium (e.g., WiFi, cellular network, radio frequency communication, near field communication, infrared signals, etc.), conductive surfaces, traces, pads, etc., or any combination of these various communication mediums, surfaces, techniques.

In some embodiments, the raw sensor data from sensors 20, 21, 22, 23 may be processed by the computing device 40 or by a separate device (or devices) prior to communication to the computing device 40. Generally speaking, processing of the raw sensor data may comprise denoising, filtering, normalizing, compressing, etc. In addition, processing of the raw sensor data may also comprise providing the raw sensor data and/or features or components of the sensor data to one or more models. The model(s) may comprise one or more machine-learning models (e.g., a neural network, a Bayesian network, a decision tree, a logistical regression model, or a normalized logistical regression, or other supervised or unsupervised learning models) that may receive the raw sensor data (and/or features or components thereof) as inputs and output indications of one or more events within the environment 12 and potentially indications of one or more characteristics or parameters of the one or more events. The outputs from the one or models may be communicated to the computing device 40 via the pathways 24, 25, 26, 27 either in addition to or in lieu of the raw sensor data from sensors 20, 21, 22, 23. Alternatively, the computing device 40 may receive the raw sensor data and then determine the indications of the one or more characteristics or parameters of the one or more events via the one or more models as previously described above.

The features of the raw sensor data from sensors 20, 21, 22, 23 may comprise statistical features (and/or transformations, combinations, or variants of such statistical features) that may be computed or otherwise derived from the raw sensor data. For instance, as previously described, in some embodiments, one or more of the sensors 21, 22, 22, 23 may comprise a fiber optic measurement system 60 that is disposed within a subterranean wellbore 70 (or some other suitable environment as described herein) as shown in FIG. 2 and previously described above. In some of these embodiments, when the fiber optic measurement system 60 is configured as a DAS, the features of the raw sensor data from fiber optic cable 62 may comprise one or more frequency domain features, such as, for instance a spectral centroid, a spectral spread, a spectral roll-off, a spectral skewness, a root mean square (RMS) band energy, a total RMS energy, a spectral flatness, a spectral slope, a spectral kurtosis, a spectral flux, a spectral autocorrelation function, or a normalized variant thereof.

In some embodiments, when the fiber optic measurement system 60 is configured as DTS, the features of the raw sensor data from fiber optic cable 62 may comprise one or more temperature features, such as, for instance, a depth derivative of temperature with respect to depth, a temperature excursion measurement, a baseline temperature excursion, a peak-to-peak value, an autocorrelation, a heat loss parameter, or a time-depth derivative, a depth-time derivative, or both. The temperature excursion measurement comprises a difference between a temperature reading at a first depth and a smoothed temperature reading over a depth range, wherein the first depth is within the depth range. The baseline temperature excursion comprises a derivative of a baseline excursion with depth, wherein the baseline excursion comprises a difference between a baseline temperature profile and a smoothed temperature profile. The peak-to-peak value comprises a derivative of a peak-to-peak difference with depth, wherein the peak-to-peak difference comprises a difference between a peak high temperature reading and a peak low temperature reading with an interval. The autocorrelation is a cross-correlation of the temperature signal with itself.

More specifically, the temperature changes that can be measured by the DTS system can result from various fluid effects within the wellbore such as cooling based on gas entering the wellbore, temperature changes resulting from liquids entering the wellbore, and various flow related temperature changes as a result of the fluids passing through the wellbore. For example, as fluids enter the wellbore, the fluids can experience a sudden pressure drop, which can result in a change in the temperature. The magnitude of the temperature change depends on the phase and composition of the inflowing fluid, the pressure drop, and the pressure and temperature conditions. The other major thermodynamic process that takes place as the fluid enters the well is thermal mixing which results from the heat exchange between the fluid body that flows into the wellbore and the fluid that is already flowing in the wellbore. As a result, inflow of fluids from the reservoir into the wellbore can cause a deviation in the flowing well temperature profile.

By obtaining the temperature in the wellbore, a number of temperature features can be obtained from the temperature measurements. The temperature features can provide an indication of one or more temperature trends at a given location in the wellbore during a measurement period. The resulting features can form a distribution of temperature results that can then be used with various models to identify one or more events within the wellbore at the location.

The temperature measurements can represent output values from the DTS system, which can be used with or without various types of pre-processing such as noise reduction, smoothing, and the like. When background temperature measurements are used, the background measurement can represent a temperature measurement at a location within the wellbore taken in the absence of the flow of a fluid. For example, a temperature profile along the wellbore can be taken when the well is initially formed and/or the wellbore can be shut in and allowed to equilibrate to some degree before measuring the temperatures at various points in the wellbore. The resulting background temperature measurements or temperature profile can then be used in determining the temperature features in some embodiments.

In general, the temperature features represent statistical variations of the temperature measurements through time and/or depth. For example, the temperature features can represent statistical measurements or functions of the temperature within the wellbore that can be used with various models to determine whether or not fluid inflow events have occurred. The temperature features can be determined using various functions and transformations, and in some embodiments can represent a distribution of results. In some embodiments, the temperature features can represent a normal or Gaussian distribution. In some embodiments, the temperature measurements can represent measurement through time and depth, such as variations taken first with respect to time and then with respect to depth or first with respect to depth and then with respect to time. The resulting distributions can then be used with models such as multivariate models to determine the presence of the fluid inflow events.

In some embodiments, the temperature features can include various features including, but not limited to, a depth derivative of temperature with respect to depth, a temperature excursion measurement, a baseline temperature excursion, a peak-to-peak value, a Fast Fourier transform (FFT), a Laplace transform, a wavelet transform, a derivative of temperature with respect to depth, a heat loss parameter, an autocorrelation, and combinations thereof.

In some embodiments, the temperature features can comprise a depth derivative of temperature with respect to depth. This feature can be determined by taking the temperature measurements along the wellbore and smoothing the measurements.

Smoothing can comprise a variety of steps including filtering the results, de-noising the results, or the like. In some embodiments, the temperature measurements can be median filtered within a given window to smooth the measurements. Once smoothed, the change in the temperature with depth can be determined. In some embodiments, this can include taking a derivative of the temperature measurements with respect to depth along the longitudinal axis of the wellbore. The depth derivative of temperature values can then be processed, and the measurement with a zero value (e.g., representing a point of no change in temperature with depth) that have preceding and proceeding values that are non-zero and have opposite signs in depth (e.g., zero below which the value is negative and above positive or vice versa) can have the values assign to the nearest value. This can then result in a set of measurements representing the depth derivative of temperature with respect to depth.

In some embodiments, the temperature features can comprise a temperature excursion measurement. The temperature excursion measurement can comprise a difference between a temperature reading at a first depth and a smoothed temperature reading over a depth range, where the first depth is within the depth range. In some embodiments, the temperature excursion measurement can represent a difference between de-trended temperature measurements over an interval and the actual temperature measurements within the interval. For example, a depth range can be selected within the wellbore. The temperature readings within a time window can be obtained within the depth range and de-trended or smoothed. In some embodiments, the de-trending or smoothing can include any of those processes described above, such as using median filtering of the data within a window within the depth range. For median filtering, the larger the window of values used, the greater the smoothing effect can be on the measurements. For the temperature excursion measurement, a range of windows from about 10 to about 100 values, or between about 20-60 values (e.g., measurements of temperature within the depth range) can be used to median filter the temperature measurements. A difference can then be taken between the temperature measurement at a location and the de-trended (e.g., median filtered) temperature values. The temperature measurements at a location can be within the depth range and the values being used for the median filtering. This temperature feature then represents a temperature excursion at a location along the wellbore from a smoothed temperature measurement over a larger range of depths around the location in the wellbore.

In some embodiments, the temperature features can comprise a baseline temperature excursion. The baseline temperature excursion represents a difference between a de-trended baseline temperature profile and the current temperature at a given depth. In some embodiments, the baseline temperature excursion can rely on a baseline temperature profile that can contain or define the baseline temperatures along the length of the wellbore. As described herein, the baseline temperatures represent the temperature as measured when the wellbore is shut in. This can represent a temperature profile of the formation in the absence of fluid flow. While the wellbore may affect the baseline temperature readings, the baseline temperature profile can approximate a formation temperature profile. The baseline temperature profile can be determined when the wellbore is shut in and/or during formation of the wellbore, and the resulting baseline temperature profile can be used over time. If the condition of the wellbore changes over time, the wellbore can be shut in and a new baseline temperature profile can be measured or determined. It is not expected that the baseline temperature profile is re-determined at specific intervals, and rather it would be determined at discrete times in the life of the wellbore. In some embodiments, the baseline temperature profile can be re-determined and used to determine one or more temperature features such as the baseline temperature excursion.

Once the baseline temperature profile is obtained, the baseline temperature measurements at a location in the wellbore can be subtracted from the temperature measurement detected by the DTS system at that location to provide baseline subtracted values. The results can then be obtained and smoothed or de-trended. For example, the resulting baseline subtracted values can be median filtered within a window to smooth the data. In some embodiments, a window between 10 and 500 temperature values, between 50 and 400 temperature values, or between 100 and 300 temperature values can be used to median filter the resulting baseline subtracted values. The resulting smoothed baseline subtracted values can then be processed to determine a change in the smoothed baseline subtracted values with depth. In some embodiments, this can include taking a derivative of the smoothed baseline subtracted values with respect to depth along the longitudinal axis of the wellbore. The resulting values can represent the baseline temperature excursion feature.

In some embodiments, the temperature features can comprise a peak-to-peak temperature value. This feature can represent the difference between the maximum and minimum values (e.g., the range, etc.) within the temperature profile along the wellbore.

In some embodiments, the peak-to-peak temperature values can be determined by detecting the maximum temperature readings (e.g., the peaks) and the minimum temperature values (e.g., the dips) within the temperature profile along the wellbore. The difference can then be determined within the temperature profile to determine peak-to-peak values along the length of the wellbore. The resulting peak-to-peak values can then be processed to determine a change in the peak-to-peak values with respect to depth. In some embodiments, this can include taking a derivative of the peak-to-peak values with respect to depth along the longitudinal axis of the wellbore. The resulting values can represent the peak-to-peak temperature values.

Other temperature features can also be determined from the temperature measurements. In some embodiments, various statistical measurements can be obtained from the temperature measurements along the wellbore to determine one or more temperature features. For example, a cross-correlation of the temperature measurements with respect to time can be used to determine a cross-correlated temperature feature. The temperature measurements can be smoothed as described herein prior to determining the cross-correlation with respect to time. As another example, an autocorrelation measurement of the temperature measurements can be obtained with respect to depth. Autocorrelation is defined as the cross-correlation of a signal with itself. An autocorrelation temperature feature can thus measure the similarity of the signal with itself as a function of the displacement. An autocorrelation temperature feature can be used, in applications, as a means of anomaly detection for event (e.g., fluid inflow) detection. The temperature measurements can be smoothed and/or the resulting autocorrelation measurements can be smoothed as described herein to determine the autocorrelation temperature features.

In some embodiments, the temperature features can comprise a Fast Fourier transform (FFT) of the distributed temperature sensing (e.g., DTS) signal. This algorithm can transform the distributed temperature sensing signal from the time domain into the frequency domain, thus allowing detection of the deviation in DTS along length (e.g., depth).

This temperature feature can be utilized, for example, for anomaly detection for event (e.g., fluid inflow) detection purposes.

In some embodiments, the temperature features can comprise the Laplace transform of DTS. This algorithm can transform the DTS signal from the time domain into Laplace domain allows us to detect the deviation in the DTS along length (e.g., depth of wellbore). This temperature feature can be utilized, for example, for anomaly detection for event (e.g., fluid inflow) detection. This feature can be utilized, for example, in addition to (e.g., in combination with) the FFT temperature feature.

In some embodiments, the temperature features can comprise a wavelet transform of the distributed temperature sensing (e.g., DTS) signal and/or of the derivative of DTS with respect to depth, dT/dz. The wavelet transform can be used to represent the abrupt changes in the signal data. This feature can be utilized, for example, in inflow detection. A wavelet is described as an oscillation that has zero mean, which can thus make the derivative of DTS in depth more suitable for this application. In embodiments and without limitation, the wavelet can comprise a Morse wavelet, an Analytical wavelet, a Bump wavelet, or a combination thereof.

In some embodiments, the temperature features can comprise a derivative of DTS with respect to depth, or dT/dz. The relationship between the derivative of flowing temperature $T_f$ with respect to depth (L) (e.g., $dT_f/dL$) has been described by several models. For example, and without limitation, the model described by Sagar (Sagar, R., Doty, D. R., & Schmidt, Z. (1991, November 1). *Predicting Temperature Profiles in a Flowing Well*. Society of Petroleum Engineers. doi:10.2118/19702-PA) which accounts for radial heat loss due to conduction and describes a relationship (Equation (1) below) between temperature change in depth and mass rate. The mass rate $w_t$ is conversely proportional to the relaxation parameter A and, as the relaxation parameter A increases, the change in temperature in depth increases. Hence this temperature feature can be designed to be used, for example, in events comprising inflow quantification.

$$\frac{dT_f}{dL} = -A\left[(T_f - T_e) + \frac{g}{g_c}\frac{\sin\theta}{JC_{pm}A} - \frac{F_c}{A}\right]. \quad (1)$$

The formula for the relaxation parameter, A, is provided in Equation (2):

$$A = \left(\frac{2\pi}{w_t C_{pl}}\right)\left(\frac{r_{ti} U k_e}{k_e + r_{ti} U f/12}\right)\left(\frac{1}{86,400 \times 12}\right) \quad (2)$$

$A$ = coefficient, $ft^{-1}$ $C_{pL}$ = specific heat of liquid, Btu/lbm – ° F.

$C_{pm}$ = specific heat of mixture, Btu/lbm – ° F.

$C_{po}$ = specific heat of oil, Btu/lbm – ° F.

$C_{pw}$ = specific heat of water, Btu/lbm – ° F.

$d_c$ = casing diameter, in.

$d_t$ = tubing diameter, in.

$d_{wb}$ = wellbore diameter, in.

$D$ = depth, ft $D_{inj}$ = injection depth, ft

-continued $f$ = modified dimentionless heat conduction time function for long times for earth $f(t)$ = dimensionless transient heat conduction time function for earth $F_c$ = correction factor $\overline{F_c}$ = average correction factor for one length interval $g$ = acceleration of gravity, 32.2ft/sec²

$g_c$ = conversion factor, 32.2ft – lbm/sec² – lbf $g_G$ = geothermal gradient, °F/ft $h$ = specific enthalpy, Btu/lbm $J$ = mechanical equivalent of heat, 778ft – lbf/Btu $k_{an}$ = thermal conductivity of material in annulus, Btu/D – ft – °F $k_{ang}$ = thermal conductivity of gas in annulus, Btu/D – ft – °F $k_{anw}$ = thermal conductivity of water in annulus, Btu/D – ft – °F $k_{cem}$ = thermal conductivity of cement, Btu/D – ft – °F $k_e$ = thermal conductivity of earth, Btu/D – ft – °F $L$ = length of well from perforations, ft $L_{in}$ = length from perforation to inlet, ft $p$ = pressure, psi $p_{wh}$ = wellhead pressure, psig $q_{gf}$ = formation gas flow rate, scf/D $q_{ginj}$ = injection gas flow rate, scf/D $q_o$ = oil flow rate, STB/D $q_w$ = water flow rate, STB/D $Q$ = heat transfer between fluid and surrounding area, Btu/lbm $r_{ci}$ = inside casing radius, in.

$r_{co}$ = outside casing radius, in.

$r_{ti}$ = inside tubing radius, in.

$r_{to}$ = outside tubing radius, in.

$r_{wb}$ = wellbore radius, in.

$R_{gL}$ = gas/liquid ratio, scf/STB $T$ = temperature, ° F.

$T_{bh}$ = bottomhole temperature, ° F.

$T_c$ = casing temperature, ° F.

$T_e$ = surrounding earth temperature, ° F.

$T_{ein}$ = earth temperature at inlet, ° F.

$T_f$ = flowing fluid temperature, ° F.

$T_{fin}$ = flowing fluid temperature at inlet, ° F.

$T_h$ = cement/earth interface temperature, ° F.

$U$ = overall heat transfer coefficient, Btu/D-ft-° F.

$v$ = fluid velocity, ft/sec $V$ = volume $w_t$ = total mass flow rate, lbm/sec $Z$ = height from bottom of hole, ft $Z_{in}$ = height from bottom of hole at inlet, ft $\alpha$ = thermal diffusivity of earth, 0.04 ft²/hr $\gamma_{API}$ = oil gravity, °API $\gamma_g$ = gas specific gravity (air = 1)

$\gamma_o$ = oil specific gravity $\gamma_w$ = water specific gravity $\theta$ = angle of inclination, degrees $\mu$ = Joule-Thomson coefficient In some embodiments, the temperature features can comprise a heat loss parameter. As described hereinabove, Sagar's model describes the relationship between various input parameters, including the mass rate $w_t$ and temperature change in depth $dT_t/dL$. These parameters can be utilized as temperature features in a machine learning model which uses features from known cases (production logging results) as learning data sets, when available. These features can include geothermal temperature, deviation, dimensions of the tubulars that are in the well (e.g., casing, tubing, gravel pack components, etc.), as well as the wellbore, well head pressure, individual separator rates, downhole pressure, gas/liquid ratio, and/or a combination thereof. Such heat loss parameters can, for example, be utilized as inputs in a machine learning model for events comprising inflow quantification of the mass flow rate $w_t$.

In some embodiments, the temperature features an comprise a time-depth derivative and/or a depth-time derivative. A temperature feature comprising a time-depth derivative can comprise a change in a temperature measurement at one or more locations across the wellbore taken first with respect to time, and a change in the resulting values with respect to depth can then be determined. Similarly, a temperature feature comprising a depth-time derivative can comprise a change in a temperature measurement at one or more locations across the wellbore taken first with respect to depth, and a change in the resulting values with respect to time can then be determined.

In some embodiments, the temperature features can be based on dynamic temperature measurements rather than steady state or flowing temperature measurements. In order to obtain dynamic temperature measurements, a change in the operation of the system (e.g., wellbore) can be introduced, and the temperature monitored using the temperature monitoring system. For example in a wellbore environment, the change in conditions can be introduced by shutting in the wellbore, opening one or more sections of the wellbore to flow, introducing a fluid to the wellbore (e.g., injecting a fluid), and the like. When the wellbore is shut in from a flowing state, the temperature profile along the wellbore may be expected to change from the flowing profile to the baseline profile over time. Similarly, when a wellbore that is shut in is opened for flow, the temperature profile may change from a baseline profile to a flowing profile. Based on the change in the condition of the wellbore, the temperature measurements can change dynamically over time. In some embodiments, this approach can allow for a contrast in thermal conductivity to be determined between a location or interval having radial flow (e.g., into or out of the wellbore) to a location or interval without radial flow. One or more temperature features can then be determined using the dynamic temperature measurements. Once the temperature features are determined from the temperature measurements obtained from the temperature monitoring system, one or more of the temperature features can be used to identify events along the length being monitored (e.g., within the wellbore), as described in more detail herein.

The one or more models may receive one or more of the features (e.g., such as those described above), and based thereon, output an indication of an event and/or characteristics thereof as previously described above. In some embodiments, this model-based analysis may occur within the computing device 40 (which is described in more detail below), within a separate device (not shown) that receives the raw sensor data and/or the features or components thereof, or a combination of the computing device and separate device(s). Regardless, the computing device 40 may receive (or may obtain via the above-described analysis) the raw sensor data, the features or components of the raw sensor data, and/or the outputs from the one or more models. All of this information received (or obtained) by the computing device 40 may generally be referred to herein as "data." The data may be stored on the computing device 40 (e.g., on memory 46 which is described below) in any suitable format, and may (in some circumstances) be compressed so as to minimize the amount of storage space that is occupied on the computing device 40 by the data.

Computing device 40 may comprise any suitable device or devices that are configured to execute computer-readable instructions. In some embodiments, computing device 40 may comprise one or more servers that may be remotely or locally positioned relative to sensors 20, 21, 22, 23 and/or display device 50 (described below). As a result, computing device 40 may be generally referred to herein as a "server," however, this name should not be interpreted as limiting other potential forms or embodiments of computing device 40 in other examples. Generally speaking, computing device 40 may comprise a processor 42 and a memory 46. The processor 42 (e.g., microprocessor) executes computer-readable instructions 44 stored on memory 46 (e.g., a non-transitory machine-readable medium), thereby causing the processor 42 (and, more generally, the computing device 40) to perform some or all of the actions attributed herein to the processor 42 (and, more generally, to the computing device 40). The memory 46 may comprise volatile storage (e.g., random access memory (RAM)), non-volatile storage (e.g., read-only memory (ROM), flash storage, etc.), or combinations of both volatile and non-volatile storage. Data read or written by the processor 42 when executing the machine-readable instructions 44 can also be stored on memory 46. The computing device is described in more detail herein.

During operations, computing device 40 may receive the raw sensor data, features or components of the raw sensor data, and/or outputs from the one or more models as previously described above. In addition, computing device 40 may receive requests to display data (e.g., raw sensor data or data derived therefrom) on the display device 50. Upon receipt of the request from display device 50, computing device 40 may perform various processing steps to organize, package, and arrange the requested data for transmission to and presentation on the display device 50 in accordance with the various methods and processes described herein. The computer-readable instructions 44 may comprise an analysis program that directs the processor 42 (and thus the computing device 40 more broadly) to perform various processing steps described herein. As will be apparent from the description below, these various processing steps performed by the computing device 40 may be aimed at presenting the sensor data (or variants, transformations, features, computations, etc. thereof) on the display device in a manner that promotes efficient correlation, analysis, and manipulation of the data by a user (e.g., a technician, engineer, etc.).

Referring still to FIG. 1, display device 50 may comprise any suitable device or unit that includes an electronic display panel 52. For instance, display device 50 may comprise a computing device with an integrated or coupled display panel 52 (e.g., such as a laptop computer, tablet computer, desktop computer, smartphone, etc.). In some embodiments, display device 50 may comprise a computer monitor, television, or other similar device. The display panel 52 may comprise any suitable electronic display system, such as, for instance, a liquid crystal display (LCD), a plasma display, an organic light emitting diode (OLED) display, an inorganic light emitting diode (ILED), etc. The electronic display panel 52 may have a resolution defined by the number of pixels (or other image units) arranged thereon. For instance, the resolution of the display panel 52 may be expressed in terms of a number of rows and columns of pixels disposed thereon (e.g., N pixel rows×M pixel columns). Generally speaking, as the number of pixels on display panel 52 increases (such that the number of rows and/or columns of pixels increases), the resolution (or image quality, or sharpness) of display panel 52 also increases.

Display device 50 and computing device 40 may exchange information via a communication pathway 48. Communication pathway 48 may comprise any suitable wired, wireless, or other suitable type or combination of communication pathway for electrical light, or other informational and/or power signals. For instance, any of the particular examples (or combinations thereof) of communication pathways 24, 25, 26, 27 may be utilized to form the communication pathway 48 between computing device 40 and display device 50.

In some embodiments, the computing device 40 and display device 50 may be integrated within a single device or system. In some embodiments the computing device 40 and display device 50 may be communicatively coupled but otherwise remotely disposed from one another. In still other embodiments, the memory 46 and/or computing device 40 may be remote from the display, which can be operated by a separate computing device. For example the computing device 40 can represent a server that receives and processes the data from the sensors, and the display device 50 can represent a remote computer, tablet, or device that accesses the information on the server for purposes of display. Still further, a plurality of such display devices 50 can be in signal communication with the computing device 40 to simultaneously access the data across a plurality of users, each of which may be remote from the other users. In this example, a computing device 40 can serve as a data repository that can serve information upon request to one or more display devices 50.

Figure 3:
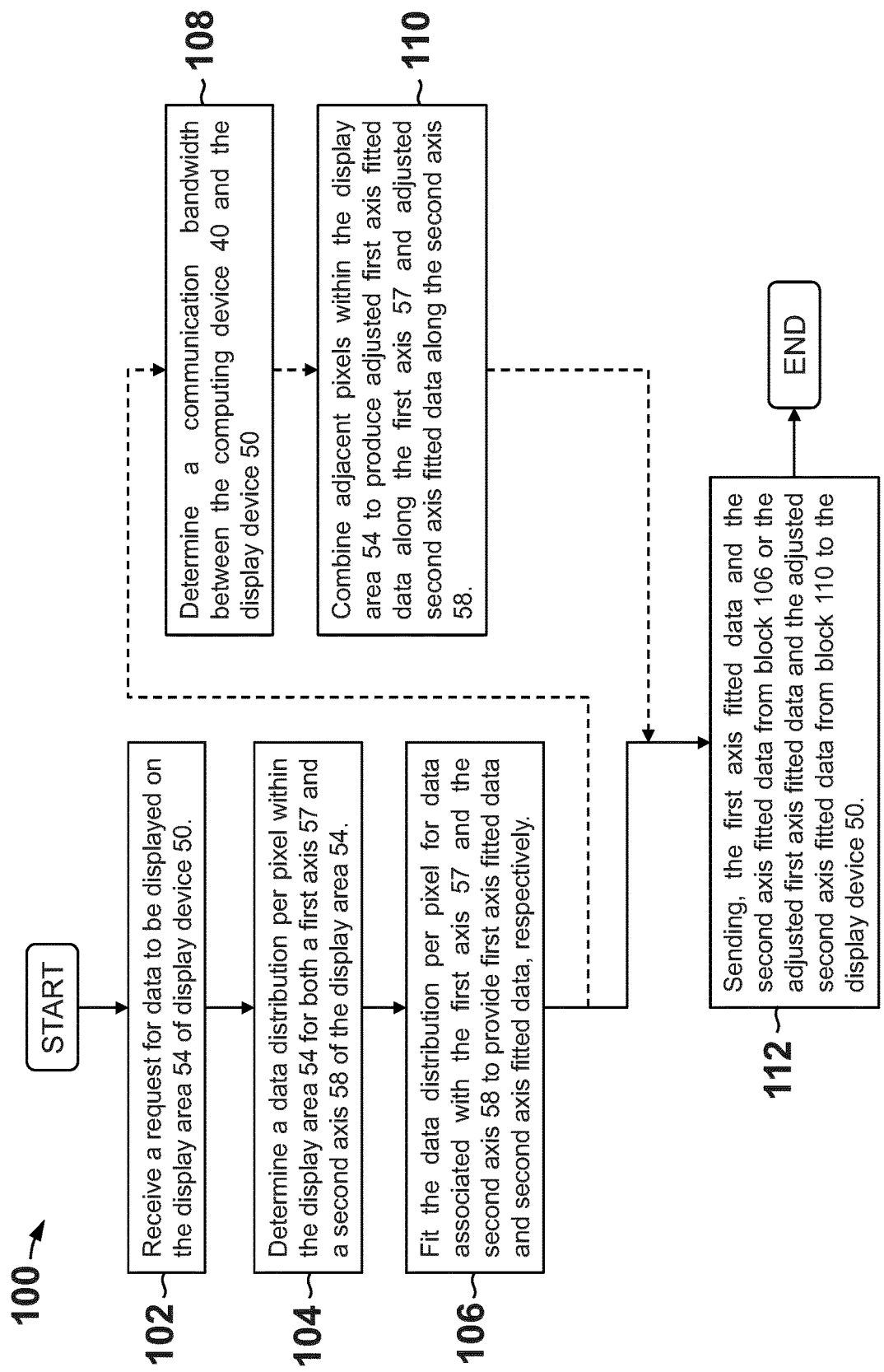
FIG. 3 is a block diagram of a method of presenting data according to some embodiments disclosed herein.

Referring now to FIG. 3, a method 100 of presenting sensor data according to some embodiments is shown. In some embodiments, the method 100 may be performed utilizing the system 10 of FIG. 1 such that sensor data is presented on the display device 50. Thus, method 100 will be described with respect to the components and features of system 10, and continuing reference is made to FIG. 1 while describing the features of method 100 depicted in FIG. 3. In some embodiments, one or more (or all) of the features of method 100 may be represented or implemented as computer-readable instructions 44 stored in memory 46. Thus, in some embodiments, the computer-readable instructions 44 representing the one or more features of method 100 may define (and thus may be referred to as) an "analysis program" that is stored in the memory 46 in the form of the computer-readable instructions.

Generally speaking, method 100 comprises various processing steps for identifying and presenting insights based on the data on the display panel 52 of display device 50. In particular, in some embodiments, display panel 52 may include a display area 54 that may comprise a portion (or substantially all) of the available display surface area thereof. The data to be displayed on the display area 54 may comprise raw sensor data from the sensors 20, 21, 22, 23, features or components of the raw sensor data, outputs from the one or more models previously described above, and/or other sources of data or transformations, combinations, or variants thereof. The data may be displayed on the display area 54 in a plot 56 which may comprise a graph, chart, or other visual representation thereof. Plot 56 may be define by at least a first axis 57 and a second axis 58 that is orthogonal to the first axis 57. In some embodiments, plot 56 may define additional axes, and thus may be configured to present data in two dimensions, three dimensions, or more than three dimensions. In the depicted embodiments, the plot 56 of display area 56 (as well as additional plots that may be included on the display area 54 as described in more detail below) may be defined by two axes (e.g., axis 57, 58, so as to simplify the discussion and better illuminate the principles of the various embodiments disclosed herein, though the same principles would apply when three or more dimensions are presented.

Initially, method 100 includes receiving a request for data to be displayed on the display area 54 of the display device 50 at block 102. In some embodiments, the request may be initialized by a user. For instance, a user may make a selection (e.g., from a suitable command prompt or menu that may be presented on display panel 52) to view data, and the display device 50 (or a computing device that is communicatively coupled thereto) may generate a suitable request that is communicated to the computing device 40 via communication pathway 48.

The request may include a pixel resolution for the display area 54 that may comprise a requested pixel resolution for the data within the display area 54. The pixel resolution of the request may comprise a maximum pixel resolution that may be presented on the display area 54, which as is previously described above, may be a function of the number of pixels within display area 54 (which may be expressed in terms of pixels columns and pixel rows). In some embodiments, pixel resolution of the request from the display device 50 may comprise a pixel resolution that is less than the maximum available pixel resolution of the display area 54 (which may be selected by the user or a computing device so as to improve or increase communication latency time between the display device 50 and computing device 40). The pixel resolution of the request may be expressed in terms of a number of pixels per unit length (e.g., an inch, centimeter, millimeter, etc.) along a defined direction within the display area, such as along one or both of the axes 57, 58. In addition, in some embodiments, the requested pixel resolution within the request may include a different resolution for the axes 57, 58. Specifically, the pixel resolution may include a request for a higher or lower pixel resolution along the first axis 57 than along the second axis 58.

In addition, the request received by the computing device 40 may comprise a first output range for the requested data along the first axis 57 and a second output range for the requested data along the second axis 58. As previously described above, in some embodiments, the environment in question may comprise a subterranean wellbore (e.g., wellbore 70 shown in FIG. 2), and the first axis 57 may represent time, while the second axis 58 may represent depth within or along the wellbore. Thus, in these instances, a first output range along the first axis 57 may comprise a time interval for the requested data, and the second output range along the second axis 58 may represent a depth interval for the requested data.

Referring still to FIG. 3, method 100 also includes determining a data distribution per pixel within the display area 54 for both the first axis 57 and the second axis 58 at block 104. In general, the data available to be displayed may not align perfectly with the resolution. For example, a given pixel may not have a corresponding raw data (or calculated feature) value that has a range that exactly matches that of the data distribution per pixel. As a result, a data fitting is performed to determine the data to be presented for the data distribution per pixel in each axis. In particular, in some embodiments the computing device 40 may determine a data distribution per pixel within display area 54 along the axes 57, 58 based on the pixel resolution, the first output range, and the second output range of the request received by the computing device via block 102. The data distribution per pixel may be presented as an amount or volume (e.g., number of data points) that are distributed into each pixel along a defined direction (e.g., such as the axes 57, 58). Thus, the data distribution per pixel along the first axis 57 comprises a defined volume or amount of data that is distributed into each pixel (or pixel group based on the requested pixel resolution) within the display area 54 along (or parallel to) the first axis 57. Likewise, the data distribution per pixel along the second axis 58 comprises a defined volume or amount of data that is distributed into each pixel (or pixel group based on the requested pixel resolution) within the display are 54 along (or parallel to) the second axis 58. Because there may be differences between the pixel resolution along the axes 57, 58 as well as between the first output range and the second output range as previously described above, the data distribution per pixel may also be different when considering data distributed along the first axis 57 and the second axis 58.

Method 100 also includes fitting the data distribution per pixel for data associated with the first axis 57 and the second axis 58 to provide first axis fitted data and second axis fitted data, respectively, at block 106. In some embodiments, the fitting at block 106 may comprise determining a representative value of the data distributed within each pixel along a defined direction within the display area 54 (e.g., along the first axis 57 or second axis 58) based on a line, function, or relationship that is fit along the entire output range of the data (e.g., the first output range or the second output range).

Figure 4:
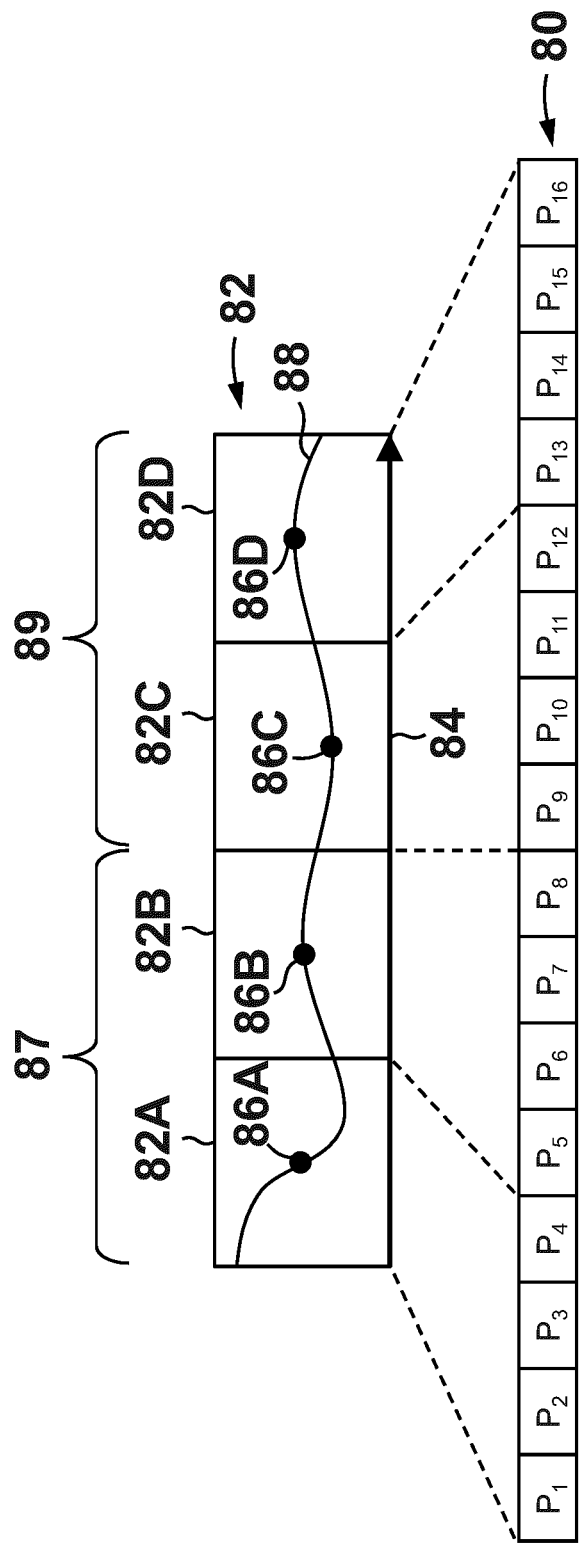
FIG. 4 is a diagram illustrating data distribution, fitting, and grouping features that may be included within embodiments of the method of FIG. 3 according to some embodiments.

For instance, reference is now made to FIG. 4, which shows an exemplary data set 80 that is being fit into a plurality of adjacent pixels 82 along a defined axis 84. The depiction of FIG. 4 shows data set 80 being fit along a one dimensional axis 84 so as to simplify the drawing and the associated description. However, it should be understood that similar techniques may be utilized in various embodiments so as to fit data into multiple axes, such as, for instance the orthogonal axes 57, 58 of the display area 54. As shown in FIG. 4, the data set 80 may comprise individual data points $P_1$-$P_{16}$ that may represent individual measurements, calculated values, model outputs, or combinations of such measurements, calculations, and/or outputs. First, the data points $P_1$-$P_{16}$ are distributed into the pixels 82A, 82B, 82C, 82D of the plurality of pixels 82. The data points $P_1$-$P_{16}$ may be distributed into the pixels 82A, 82B, 82C, 82D according to the process described above for block 104 of method 100. Next, the data points $P_1$-$P_{16}$ are fit along a function or line 88 along the entire output range of the data set 80 (e.g., such as along the entire output range defined between $P_1$ and $P_{16}$). The line 88 may be a nonlinear curve, such as a polynomial, and may be generated by mathematically fitting the data points $P_1$-$P_{16}$ into a suitably ordered polynomial function. As a result, the data fit depicted in FIG. 4, and thus performed at block 106 may comprise a nonlinear fit and particular a polynomial fit in some embodiments. Specifically, to fit the distributed data points $P_1$-$P_{16}$ along the line 88, representative values 86A, 86B, 86C, 86D are selected for each of the pixels 82A, 82B, 82C, 82D along the line 88. The selected values 86A, 86B, 86C, 86D may comprise mid-point values along the segments of the line 88 overlaying the pixels 82A, 826, 82C, 82D, respectively. The values 86A, 86B, 86C, 86D may then represent fitted data for the axis 84. The process can be repeated for additional axis, and the data fit for each axis can have the same or different data distribution per pixel. Accordingly, referring again to FIG. 3, the above-described techniques and methods for fitting the data set 80 along axis 84 may be utilized at block 106 so as to fit the data into the axes 57, 58 and thereby produce the first axis fitted data and second axis fitted data. As will be described in more detail below, in some embodiments of method 100, the first axis fitted data and the second axis fitted data may be sent to the display device 50 (e.g., from the computing device 40) at block 112 after block 106.

In some embodiments, method 100 also includes determining a communication bandwidth between the computing device 40 and the display device 50 at block 108. For instance, as shown in FIG. 1, the block 108 may comprise determining a bandwidth of the communication pathway 48 between computing device 40 and display device 50 (which may be referred to as a "communication bandwidth"). The communication bandwidth of communication pathway 48 may comprise one or both of the computing device 40 and display device 50 pinging one another to assess the speed of the communication therebetween. The communication pathway 48 can comprise a local area network (e.g., an internal network) or computing routing, and/or the communication pathway 48 can comprise a wide area network such as the internet (or other communication pathway). In some embodiments, determining the communication bandwidth of the communication pathway 48 comprises determining a communication latency time between the computing device 40 and the display device 50. Specifically, the communication latency time between the computing device 40 and display device 50 may comprise an estimate or determination of the time required to transfer requested data between the computing device 40 and display device 50. For instance, the communication latency time may comprise the estimated or determined amount of time necessary to transfer the requested data from computing device 40 to the display device 50.

In some embodiments, the communication pathway 48 comprises a direct communication pathway between the computing device 40 and the display device 50. In some embodiments, the communication pathway 48 comprises an indirect communication pathway that facilitates communication between the computing device 40 and the display device 50 through one or more other devices (e.g., routers, computing devices, servers, etc.).

Referring still to FIG. 3, method 100 also includes combining adjacent pixels within the display area 54 to produce adjusted first axis fitted data along the first axis 57 and adjusted second axis fitted data along the second axis 58 at block 110. In particular, referring briefly again to the example of FIG. 4, adjacent pixels 82A, 82B may be combined into a first pixel group 87, and adjacent pixels 82C, 82D may be combined into a second pixel group 89. The pixel groups 87 and 89 may be represented as an average or other suitable combination of the representative values 86A, 86B and 86C, 86D, respectively. These representative values of the pixel groups 87, 89 may then represent adjusted fitted data along the axis 84. Thus, by combining the pixels 82A, 82B into a first pixel group 87, and combining the pixels 82C, 82D into a second pixel group 89, the amount of data may be substantially reduced (e.g., by 50% in the illustrated example). Similar techniques may be utilized to combine and thus reduce the amount of data along the axes 57, 58 within display area 54, such that data may be reduced in two dimensions or more.

Accordingly, in some embodiments, combining the adjacent pixels to produce the adjusted first axis fitted data and the adjusted second axis fitted data at block 110 may be carried out based on the communication bandwidth determined at block 108. Specifically, in some embodiments, a minimum communication bandwidth may be defined (e.g., based on the request received by the computing device 40 at block 102, or based on previously implemented instructions of parameters that may be stored on memory 46, etc.), and compared to the determined communication bandwidth from block 108. If the determined communication bandwidth is below the minimum communication bandwidth, computing device 40 may implement the pixel combinations at block 110 accordingly so as to reduce an amount of data that is ultimately transferred to the display device 50 (e.g., via block 112). In some embodiments, the request may comprise a maximum communication latency time that may be selected by the user or that may be a default value. The computing device 40 may determine the communication latency time between the computing device 40 and display device 50 based on the communication bandwidth and compare the determined communication latency time to the maximum communication latency time. If the determined communication latency time is greater than the maximum communication latency time, the computing device may then implement the pixel combinations described above for block 110 so as to reduce the data to be presented within the display area 54 and therefore reduce the communication latency time between the computing device 40 and the display device 50 to or below the maximum communication latency time. Therefore, the selection of how many adjacent pixels should be combined into pixel groups (e.g., pixel groups 87, 89 for the example in FIG. 4), may be determined based on the error between the determined communication latency and the maximum communication latency.

As a result of the combinations of block 110, functional representation of the data within the display area 54 may become more "pixelated," such that adjacent pixels are combined to form a new, larger functional pixel. Therefore, the adjusted first axis fitted data and the adjusted second axis fitted data may provide a representation of the data within the display area 54 that is at a lower resolution from the maximum pixel resolution available within the display area 54. However, the reduced resolution is offset by a reduction in the total amount of data that is transferred from the computing device 40 and the display device 50 and therefore reduces the communication latency time therebetween.

Referring again to FIG. 3, finally, method 100 comprises sending the first axis fitted data and the second axis fitted data from block 106 or the adjusted first axis fitted data and the adjusted second axis fitted data from block 110 to the display device 50 at block 112. The data (e.g., from block 106 or block 110) may be sent from the computing device 40 to the display device 50 via the communication pathway 48. The speed of this transmission (e.g., as characterized by the communication latency time between the computing device 40 and display device 50) may be dependent on the amount of information provided by the data from block 106 or block 110 as previously described above.

Figure 5:
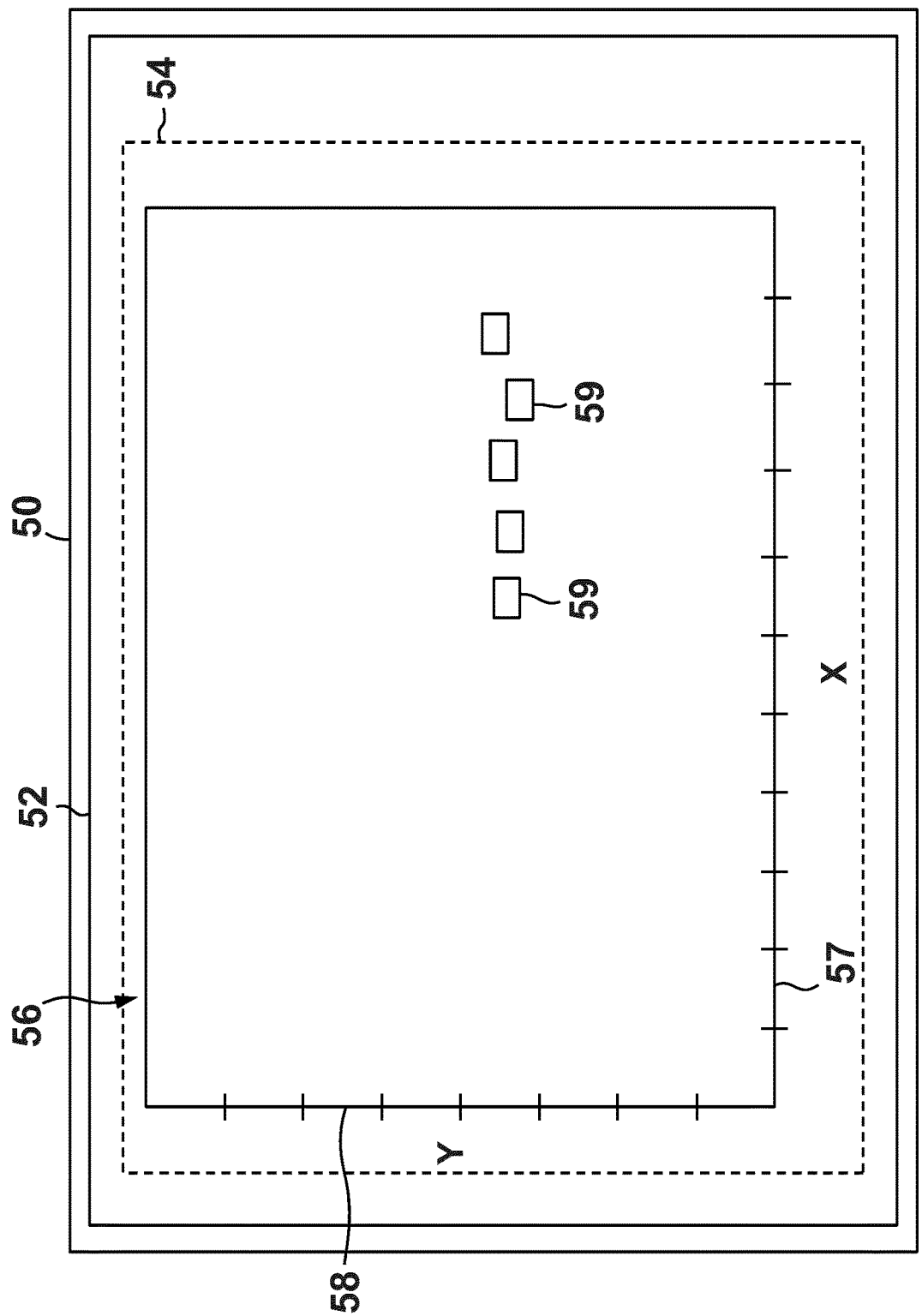
FIG. 5 is a depiction of a display area of a display device of the system of FIG. 1 according to some embodiments.

Referring now to FIG. 5, a representative example of the plot 56 within display area 54 that may be produced and presented as a result of an embodiment of method 100 is shown. In some embodiments, the plot 56 may comprise a color-coded heat map that shows variations of colors within the two-dimensional space defined by axes 57, 58 to represent variations in data values. The dimensions X, Y of the plot 56 may be chosen based on the environment in question (e.g., environment 12) and the nature of the sensor data (e.g., the data originated from sensors 20, 21, 22, 23). In at least some embodiments, one of the dimensions X, Y may be time as many data sets associated with monitoring an environment comprise are time-variable so as to indicate when certain events or conditions occur therein. In some embodiments, the X dimension along the first axis X may represent a time range of the presented data. In addition, as previously described above, in some embodiments, the environment may comprise a subterranean wellbore (e.g., wellbore 70), and the data presented in the plot 56 may comprise measurements and/or calculations that vary based on time and depth with the wellbore. Thus, in some embodiments, one of the dimensions X, Y may represent time, while the other of the dimensions X, Y may represent depth for the presented data. In some specific examples, the dimension X along the first axis 57 represents time, and the dimension Y along the second axis 58 represents depth. In addition, in some of these embodiments, the data supplied to the plot 56 may comprise data derived from a DAS or DTS within the wellbore. Thus, the color variations may indicate certain fluid flow events within the wellbore based on time and depth.

For instance, in the example of FIG. 5, a series of varied color blips 59 can appear at a particular depth (or depth interval) along axis 58 and for specified time interval along axis 57. The blips 59 may indicate a fluid flow event (e.g., fluid inflow, fluid outflow, fluid flow, etc.), and in this particular example represent a fluid inflow event at the indicated depth and time intervals (e.g., as being the acoustic signature of fluid inflow detected by the DAS, or the temperature signature of the fluid inflow detected by the DTS). The blips 59 may be derived from one or more models (e.g., machine learning models) that received the raw sensor data or features and components thereof as previously described above. In addition, the data represented by the blips 59 may have been fitted and possibly grouped in the manner previously described above for method 100, so as to facilitate the representation thereof on the display area 54 in the manner depicted.

Accordingly, via the plot 56 presented on the display area 54 as shown in FIG. 5, a user (e.g., a technical, engineer, etc.) may quickly identify and locate fluid inflows (or another suitable event of interest) within the wellbore (e.g., wellbore 70) at a particular depth and over a time interval. As a result, the user may more quickly and efficiently assess the conditions within the wellbore and proscribe an effective mitigation or response strategy as appropriate.

As previously described above, in some embodiments, the plot 56 within display area 54 may include more than the two depicted axes 57, 58. For instance, additional dimensions may be depicted in the plot 56 so as to illustrate multiple groups or bins of data simultaneously.

In some embodiments, data can be compared across measurement ranges to identify events. In many cases, data from one or more sensors alone may not illuminate the physical characteristics or events occurring within a particular environment. In fact, analysis is often conducted across multiple measurements in order to allow the observer to draw useful conclusions about the environment and events occurring therein.

Figure 6A:
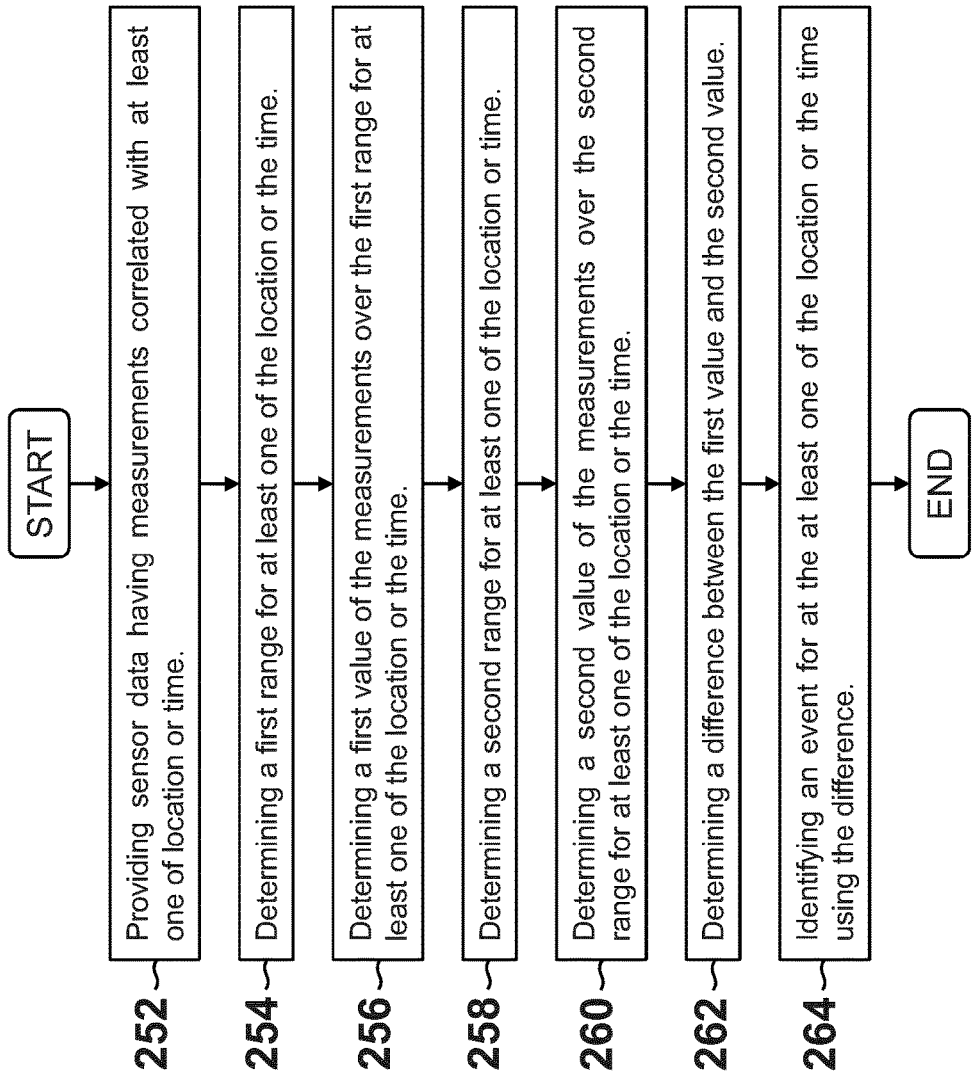
FIG. 6A is a block diagram of a method of presenting data according to some embodiments disclosed herein.

Accordingly, reference is now made to FIG. 6A wherein a method of presenting data according to some embodiments is shown. In some embodiments, the method 250 may be performed utilizing the system 10 of FIG. 1 such that sensor data is obtained from one or more of the sensors (e.g., sensors 20, 21, 22, 23). Thus, method 200 will be described with respect to the components and features of system 10, and continuing reference is made to FIG. 1 while describing the features of method 250 depicted in FIG. 6A. In some embodiments, one or more (or all) of the features of method 250 may be represented or implemented as computer-readable instructions 44 stored in memory 46. Thus, in some embodiments, the computer-readable instructions 44 representing the one or more features of method 250 may define (and thus may be referred to as) an "analysis program" that is stored in the memory 46 in the form of the computer-readable instructions.

Initially, method 250 can include providing sensor data at block 252. As previously described, the sensor data may comprise raw sensor data from one or more sensors (e.g., sensors 20, 21, 22, 23), components or features of the raw sensor data, as well as combinations and variants thereof. In addition, as shown in FIG. 1, the sensor data can be correlated with at least one of location or time. For example, each sensor measurement can contain a time stamp associated with the time the specific sensor measurement was obtained. The sensor data may also be correlated with a location such as a location identifier, a sensor identifier that can be correlated with a known sensor position, or the like. This can allow the actual sensor measurements to be associated with at least one a location or time.

In order to identify an event within the sensor data, a user can first select or determine a first range for at least one of the location or the time at block 254. The first range can represent a range of values of interest. For example, the first range can be a first time range or a first depth range. Within the selected first range, the sensor data can be presented as sensor measurement values obtained starting with the first range start point and ending with the first range end point. Additional data can be present within the selected sensor data in the first range, though not all of the data present in the sensor data may be used in the event detection.

The data within the first range can be used to determine a first value of the measurements over the first range for at least one of the location or the time at block 256. The value of the measurements can represent various aspects of the data. In some aspects, the value of the measurements can be an average of the measurements over the first range, a maximum value of the measurements within the first range, a standard deviation of the measurements within the first range, or a median value of the measurements over the first range. As an example if the first range is a time range and the measurement of interest is an acoustic amplitude, then the first value may comprise an average or a maximum of the acoustic amplitude within the first time range. As another example in the wellbore context, the first range may comprise a depth range within the wellbore and the measurements may comprise an inflow value calculated across a plurality of sensor outputs. The first value may then comprise a median value of the inflow value across the depth range at a given time or time interval.

A second set of values can then be examined to help to identify an event. For example, a second range for at least one of the location or time can be determined in block 258. The second range can be for the same variable or values as the first range. For example, if the first range represents a time interval, then the second range can also be a time interval. The first range and the second range will be different, though the first range and the second range may or may not overlap. Further, the first range and the second range may or may not represent the same interval amount.

For example, if the first range represents a time interval of one hour, the second range may represent a different time interval of one hour, or the second range can represent a time interval of more or less than one hour (e.g., 5 minutes to 24 hours' worth of data).

A second value of the measurements can then be determined over the second range for at least one of the location or the time in block 260. The second value can include any of those described with respect to the first value of the measurements. In some aspects, the first value and the second value of the measurements will represent the same type of value so that the two values or sets of values can be compared. For example, if the first value of the measurements represents an average of the values over the first range, then the second value of the measurements can also represent an average of the values over the second range.

The two determined values (e.g., the first value and the second value of the measurements) can be used to identify an event. In some embodiments, a difference between the first value and the second value can be determined at block 262. The difference can then be used to identify an event for the location or time (e.g., corresponding to the variable selected for the range, etc.) in block 264.

The selection of the first range and the second range can be used to help to isolate the measurements, values, and/or features associated with the event from background values. For example, the first range can be selected to correspond or represent at least one of the location or the time during which the event is not occurring. The first range can then be used to select a baseline of the measurements without an event. The second range can be selected to represent at least one of the location or the time during which the event is occurring. The second range can be selected even if the identification of the event is unknown, and only an indication of a measurement greater than the value of the measurement(s) within the first range is observed. A difference between the first value and the second value can then represent a removal of the baseline measurements from the event measurements such that the remaining measurement values can be attributed to the event itself. This can allow the remaining measurements to be correlated to an event using known correlations. For example, various signatures, machine learning models, or the like can be used with the difference values to identify the specific event occurring at the time and/or location.

Referring again to FIG. 1, in addition to the methods described above for identifying insights and presenting data on a display device (e.g., method 100), computing device 40 may also perform methods related to the correlation of the sensor data presented in plot 56 with other, related data that may be derived from the sensors 20, 21, 22, 23, or that may be sourced from other devices and/or locations. In many cases, data from one or more sensors alone may not illuminate the physical characteristics or events occurring within a particular environment. In fact, analysis is often conducted of multiple sources or types of data in order to allow the observer to draw useful conclusions about the environment and events occurring therein.

Figure 6B:
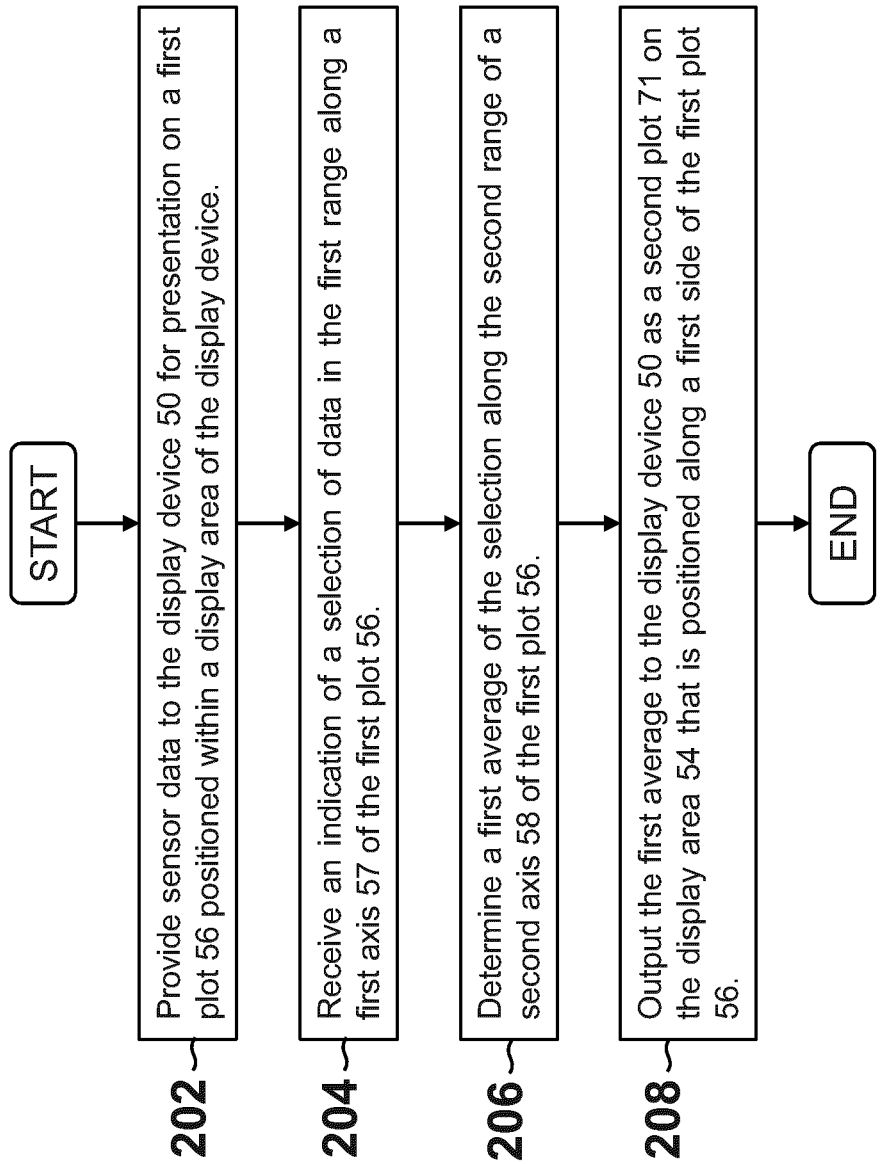
FIG. 6B is another block diagram of a method of presenting data according to some embodiments disclosed herein.

Accordingly, reference is now made to FIG. 6B wherein a method of presenting data according to some embodiments is shown. In some embodiments, the method 200 may be performed utilizing the system 10 of FIG. 1 such that sensor data is presented on the display device 50. Thus, method 200 will be described with respect to the components and features of system 10, and continuing reference is made to FIG. 1 while describing the features of method 200 depicted in FIG. 6B. In some embodiments, one or more (or all) of the features of method 200 may be represented or implemented as computer-readable instructions 44 stored in memory 46. Thus, in some embodiments, the computer-readable instructions 44 representing the one or more features of method 200 may define (and thus may be referred to as) an "analysis program" that is stored in the memory 46 in the form of the computer-readable instructions.

Initially, method 200 can include providing sensor data to the display device 50 for presentation on a first plot 56 positioned within a display area 54 of the display device 50 at block 202. As previously described, the sensor data may comprise raw sensor data from one or more sensors (e.g., sensors 20, 21, 22, 23), components or features of the raw sensor data, as well as combinations and variants thereof. In addition, as shown in FIG. 1, the sensor data has a first range (e.g., a first viewing range) along the first axis 57 and a second range (e.g., a second viewing range) along the second axis 58. In some embodiments, providing the sensor data to the display device 50 may be accomplished via the features and processes previously described above for method 100 (FIG. 3).

In addition, method 200 includes receiving an indication of a selection of data in the first range along a first axis 57 of the first plot 56 at block 204. In some embodiments, the indication of the selection may comprise receiving a user selection (e.g., a highlight, numeric input, menu selection, etc.) of a portion (e.g., a sub-set) of the first range along the first axis 57. In some embodiments, the selection may comprise the entire first range along the first axis 57. For instance, in some of these embodiments the user selection at block 204 may comprise the initial request for the first range of data along the first axis 57 (see e.g., block 102 of method 100 in FIG. 3). The indication of the first range can correspond to the first range described with respect to the method 250, and can represent the display of the values and method determined in method 250.

Figure 7:
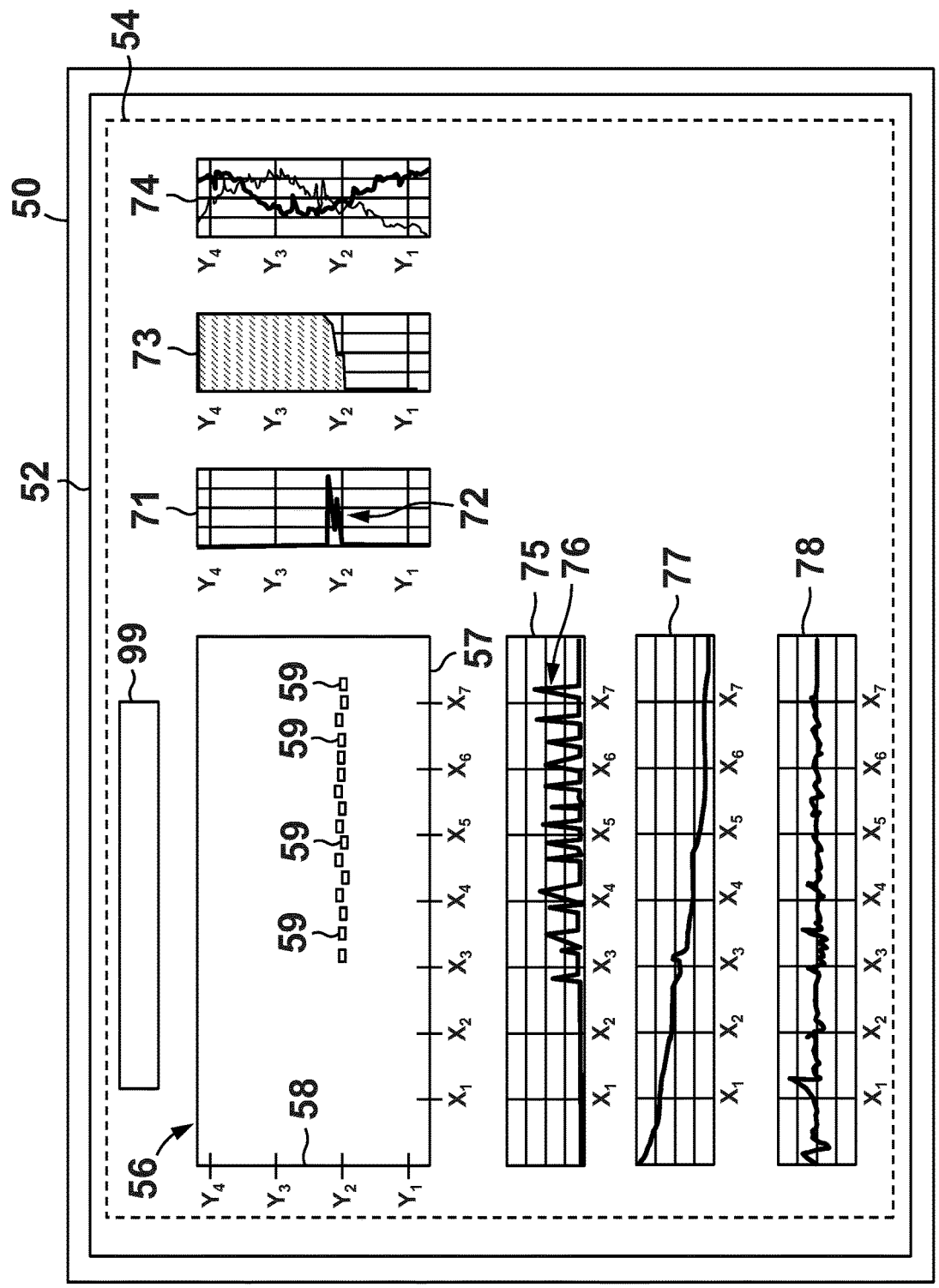
FIG. 7 is a depiction of a display area of a display device of the system of FIG. 1 according to some embodiments.

In some embodiments, the selection at block 204 may comprise a zoom-in selection whereby a user may receive an initial presentation of data with plot 56, and then may select a sub-set of the presented data along one of the axes 57, 58 for closer inspection. As a result of the selection, the presentation on the plot 56 may be "zoomed" in on the data of the selection. For instance, referring again to FIG. 5, a user may wish to analyze the blips 59 in closer detail, and therefore may select (e.g., again via highlight, menu selection, numeric input, etc.) a portion of the first axis 57 that corresponds to the blips 59. The user may select not only the portion of first axis 57 that displays the blips 59 but also a portion preceding the blips 59 in order to assess the change in condition that brought about the fluid flow event indicated by the blips 59. The result of the selection along the first axis 57 is shown in FIG. 7, which provides a closer, more granular view of the blips 59 along the first axis 57. In this embodiment, the selection along the first axis 57 did not involve a sub-set selection (or zoom) along the second axis 58, and thus, the first plot 56 in FIG. 7 retains the same scale and range of the data along the second axis 58 as prior to the user selection. It should be appreciated that in some embodiments, the selection of data along the first axis 57 may be accompanied by a selection along the second axis 58, or a selection may involve selecting data along the second axis 58 while retaining the data scale or range along the first axis 57.

Referring again to FIG. 6B, method 200 can also include determining a first average of the selection along the second range of the second axis 58 of the first plot 56 at block 206. Specifically, at block 206 an average (or mean) of the selection along the first axis 57 may be computed for each point (or select points) along the second range of second axis 58 within plot 56. This computation effectively reduces and combines the entire selection along the first axis 57 into a single "slice" spread along the second axis 58. Using this representational slice, a user may then see how the data in question has varied along the dimension of the second axis 58 for the selection along the first axis 57.

Method 200 concludes at block 208 by outputting the first average to the display device 50 as a second plot 71 on the display arear 54 that is positioned along a first side of the first plot 56. More particularly, reference is again made to FIG. 7, wherein a second plot 71 is disposed along a side of the first plot 56 that is parallel to the second axis 58. The second plot 71 illustrates the first average of the selection along the first axis 57 along the presented range of the second axis 58 (e.g., from $Y_1$ to $Y_4$). As is depicted in FIG. 7, the first average in the second plot 71 shows a clear set of peaks 72 that are correlated to the general location of the blips 59 along the second axis 58 in first plot 56. As a result, the second plot 71 allows the user to assess an average value associated with the event indicated by the blips 59 along the second axis 58 via the first average shown on the second plot 71.

Referring still to FIG. 7, in addition to the second plot 71, the display area 54 of some embodiments may include additional plots (e.g., plots 73, 74, 75, 77, 78) arranged along the sides of first plot 56 so as to allow an observer to correlate multiple data streams and data views at one time. More particularly, in some embodiments, an additional "slice" of the data presented on the first plot 56 may be presented in a third plot 75 that is arranged on a side of the first plot 56 that is parallel to the first axis 57. This third plot 75 may comprise a second average of the data along the second range of the second axis 58 along the first axis 57 that is determined in generally the same manner described above in method 200 for the second plot 71. The second average shows multiple peaks 76 that correspond with the blips 59 shown in the first plot 56. Accordingly, an observer may quickly assess the average magnitude of the blips 59 indicated by the various peaks 76 within the third plot 75. The third plot 75 may be generated in the same fashion as described above for the second plot 71 (e.g., via blocks 202-208 of method 200 in FIG. 6B).

Referring still to FIG. 7, in addition to the slices provided by the second plot 71 and third plot 75, the display area 54 may also include additional plots or other suitable information presentation devices that allow a user to correlate multiple data sets with the data presented in the first plot 56. For instance, as previously described above, in many instances, the data presented in the first plot 56 is taken over a non-zero interval of time (e.g., the range disposed along first axis 57). As a result, for at least some embodiments, the data of the first plot 56 may be referred to as "time-variable data," or "dynamic data." Additional data sets that may represent a snap-shot in time (e.g., the plots 71, 73, 74) may also be presented that provide non-time variable or "static" data sets that may be aligned and correlated with at least one of the axes 57, 58 (e.g., such as the second axis 58 for embodiments that place time along the first axis 57). Without being limited to this or any other theory, the presentation and correlation of dynamic data as well as static data along a common axis of the first plot 56 (e.g., the second axis 58) may allow a user to perform a more complete observation of the environment (e.g., the environment 12 in FIG. 1) via the various data streams.

As is also previously described above, in some embodiments, the environment 12 comprises a subterranean wellbore 70 (FIG. 2), and one or more of the sensors 20, 21, 22, 23 (FIG. 1) may comprise a DAS and/or a DTS disposed within the wellbore 70. The display area 54 of the embodiment of FIG. 7 provides additional data streams and plots (e.g., plots 71, 73, 47, 75, 77, 78) that may be useful for consideration for such embodiments, and additional details of these specific data streams are described in more detail below so as to further illustrate some embodiments disclosed herein.

Specifically, in the embodiment of FIG. 7, the data presented in the plot 56 may result from DAS and/or DTS readings within a wellbore, and may provide an indication of fluid flows (e.g., fluid inflow, fluid outflow, fluid flow within, etc.) in and around the wellbore over a period of time. As a result, in the first plot 56 (as previously described), the first axis 57 may represent time, while the second axis 58 represents depth within the wellbore. Accordingly the "slice" of second plot 71 may provide an average of the DAS/DTS data (or features or components thereof, or the output of one or more models receiving the DAS and/or DTS data or features/components thereof as inputs), may for a selected time interval (e.g., the "first selection" in block 204 of method 200 in FIG. 6B) across the depth interval depicted in the first plot 56. When the plot 56 provides an indication of fluid inflow into the wellbore 70, this second plot 71 may then provide an estimation of the volume or amount of the fluid inflow associated with the blips 59 through the selection of the time interval along the first axis 57 ranged along the depth interval depicted in the first plot 56.

In addition, additional plots 73, 74 are provided alongside the second plot 71 that depict other non-time variable data sets that are ranged and correlated along the same depth interval of the second axis 58 in the first plot 56 so as to allow a user to draw further conclusions about the wellbore environment as generally described above. Specifically, in this embodiment, the plot 73 includes an accumulated fluid inflow totals along the depth interval $Y_1$-$Y_4$ of the wellbore along the same selected time interval used to compute the first average shown in the second plot 71. Utilizing this additional plot 73, a user may ascertain how much (e.g., as a fraction or percentage) of the total inflow into the wellbore is provided by various inflow locations along the selected depth interval of the first plot 56.

Also, in this embodiment, the plot 74 may provide one or more petro-physical logs across the selected depth interval. The petro-physical logs that may be shown may include any suitable log data of the wellbore and/or surrounding subterranean formation ranging by depth. For instance, in some embodiments, the petro-physical logs presented within the plot 74 may include one or more of gamma ray radiation, electrical resistivity, water saturation, porosity, pore space or volume, permeability, etc. Other petro-physical logs may be included in other embodiments, and no limitation is intended on the various petro-physical logs that may be presented in the log 74 in various embodiments. Regardless, in the plot 74 the one or petro-physical logs may be presented along the same presented range of the wellbore depth along the second axis 58 so as to correlate the petro-physical log data with the other data presented in the display area 54.

Further, in the display area 54 of the embodiment of FIG. 7, additional plots 77, 78 are provided alongside the third plot 75 that depict other time-variable data sets that dot not vary with respect to depth within the wellbore. For instance, the plot 77 may include a downhole pressure within the wellbore over the time interval depicted along the first axis 57, and the plot 78 may depict a first derivative of the downhole pressure within the wellbore over the time interval depicted along the first axis 57. These additional plots 77, 78 may allow a user to correlate the downhole pressure and/or changes therein with the detected fluid inflows at the blips 59. Specifically, because these additional pressure readings are presented over the same time interval presented in the first plot 56, additional correlations may be made between the plots 756, 75, 77, 78 to further illuminate the conditions and events occurring within the wellbore environment.

Figure 8:
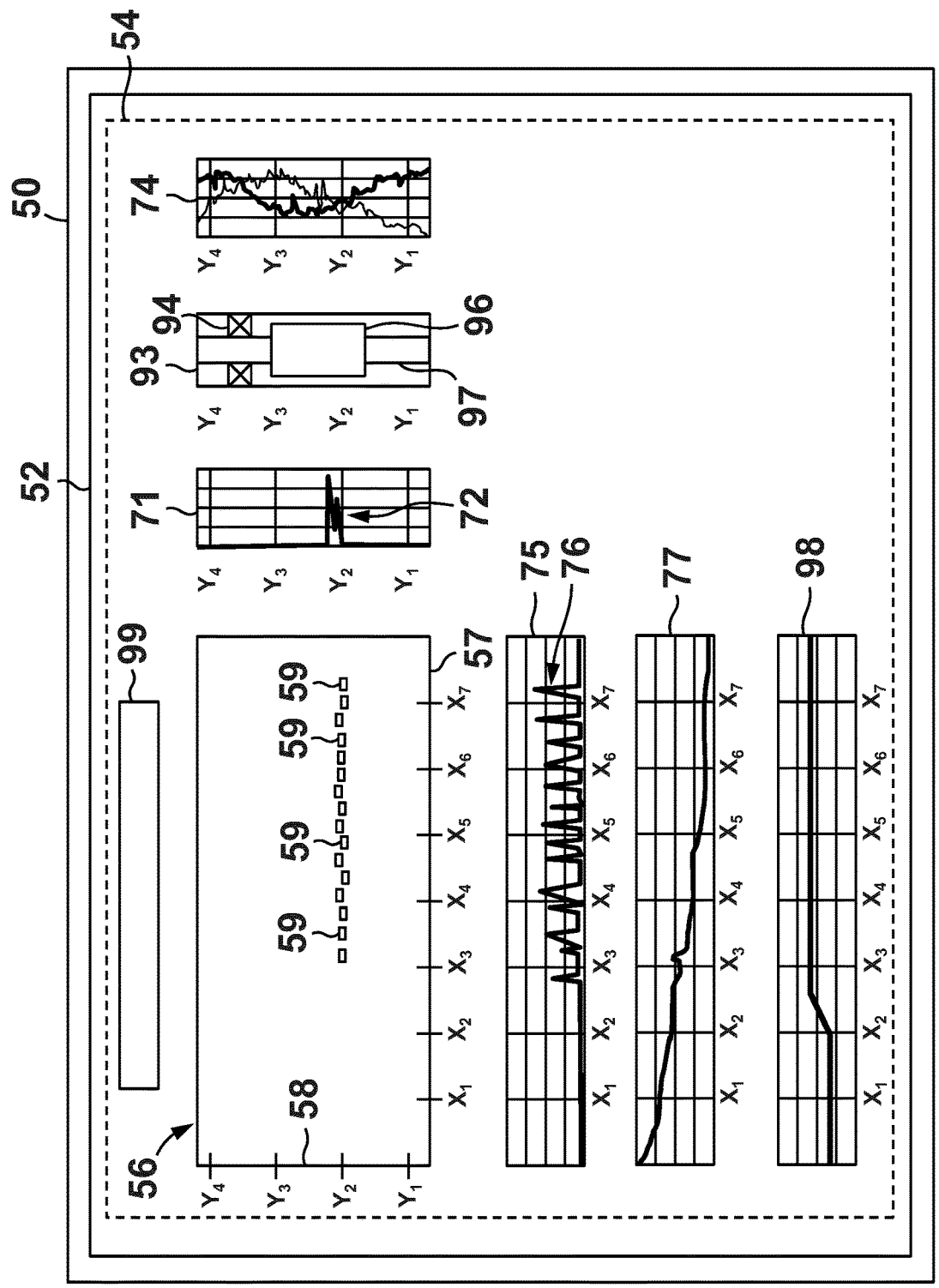
FIG. 8 is a depiction of a display area of a display device of the system of FIG. 1 according to some embodiments.

Referring briefly now to FIG. 8, another embodiment of a display area 54 on the display device 50 that may be generated as a result of the methods described herein is shown. The display area 54 of FIG. 8 is essentially the same as the display area 54 of FIG. 7, except that the plots 73 and 78 are replaced with plots 93 and 98, respectively, so as to illustrate additional possible plots and data sets that may be presented alongside the first plot 56 in some embodiments.

Specifically, the plot 93 may provide at least a schematic illustration of the wellbore equipment along the depth interval depicted along the second axis 58 in the first plot 56. The specific equipment depicted may depict or illustrate, in some scenarios, the completion type of the wellbore. For instance, in the depicted embodiment of FIG. 8, the wellbore equipment depicted along the selected depth interval includes a screen assembly 96 and a packer 94. The screen assembly 96 may comprise one or more layers of mesh or other filtering medium that are configure to filter fines (e.g., sand, particles) that may be produced form the subterranean formation so as to prevent such fines from advancing into the production tubing 87 within the wellbore and possibly up to the surface. Without being limited to this or any other theory, by providing at least a schematic depiction of the wellbore equipment (e.g., completion equipment) that is correlated along the selected depth interval (e.g., the range of the first plot 56), a user may be able to correlate the various fluid flows to the positioning of the various equipment components and therefore draw additional useful conclusions. For instance, observance of fluid flow (e.g., via the data in the first plot 56 and possibly the slices provides by the plots 71, 75) at a depth above the packer 94 may indicate that the packer 94 has failed, so that the user may then take additional steps to remediate the failure.

In addition, the plot 98 may provide a position of the choke or other back pressure device over the time interval depicted in the first plot 56. As with the data in the plots 75, 77, the choke position of plot 98 may be correlated with the other time-variable data of the plots 56, 75, 77 so that additional useful conclusions may be drawn by the user. For instance, without being limited to this or any other theory, a change in the position of the choke as indicated by the plot 98 may provide a causal link to a change in the fluid inflows detected by the plots 56, 77 when the change in choke position is observed along the same relative timeline as the other plots 56, 75, 77.

In still other embodiments, the various plots included in the display area 54 may also include a temperature gradient plot that shows a thermal gradient (e.g., a geothermal gradient along the depth of the wellbore). The thermal gradient plot may be presented alongside first plot 56 along with the plots 71, 73, 74, 93 (e.g., on the side of the first plot 56 that is parallel with the second axis 58). Still other plots or data streams may be depicted along sides the various plots of the display areas 54 shown in FIGS. 7 and 8.

Further, the data utilized to construct the various plots within the display area 54 may not only include sensor data (e.g., obtained from the sensors 20, 21, 22, 23), but may additionally include data sets that are provided by a user (e.g., such as from the display device 50 or another computing device coupled thereto). Thus, the presentation of data on the display area 54 may not be limited to data obtained or derived from the sensors 20, 21, 22, 23.

Still further, in some embodiments, a user may make a selection or highlight an interval along the first axis 57 and/or the second axis 58 of the first plot 56. This highlight or selection may then be translated to each of the additional plots 71, 72, 74, 75, 77, 78, 93, 98 for any shared axes (e.g., one of the first axis 57 or the second axis 58) so as to better highlight or illuminate correlations across the various plots along common axes or dimensions.

Referring now to FIGS. 7 and 8, in some embodiments, a menu selection device 99 may be included within (or adjacent to) the display area 54. The menu selection device may allow a user to select and/or adjust the data set that is depicted and displayed within the first plot 56. For instance, the menu selection device 99 may include a drop-down menu that allows the selection of various available data sets (e.g., DAS data, DTS data, model outputs, particular features/components of the DAS or DTS data, etc.). In addition, menu selection device 99 may also include additional fill in blocks or other selectable menus (e.g., drop down menus, scroll menus, etc.) that allow a user to designate various parameters of the selected data set, such as, for instance, the ranges along the axes 57, 58, the desired pixel resolution, etc.). Accordingly, upon making one or more menu selections with the menu selection device 99, a request may be output based on the menu selections to the computing device 40 (FIG. 1) and data may be organized and delivered for presentation on the display device 50 according to the features previously described above for method 100.

The embodiments disclosed herein include systems and methods for storing, organizing, correlating, and presenting data obtained for an environment such that a user (and/or computing system) may efficiently draw useful conclusions and insights about the environment in question. As described in more detail above, through use of the systems and methods disclosed herein, actionable insights may be gained from voluminous, interrelated data associated with an environment in a faster and more efficient manner.

Figure 9:
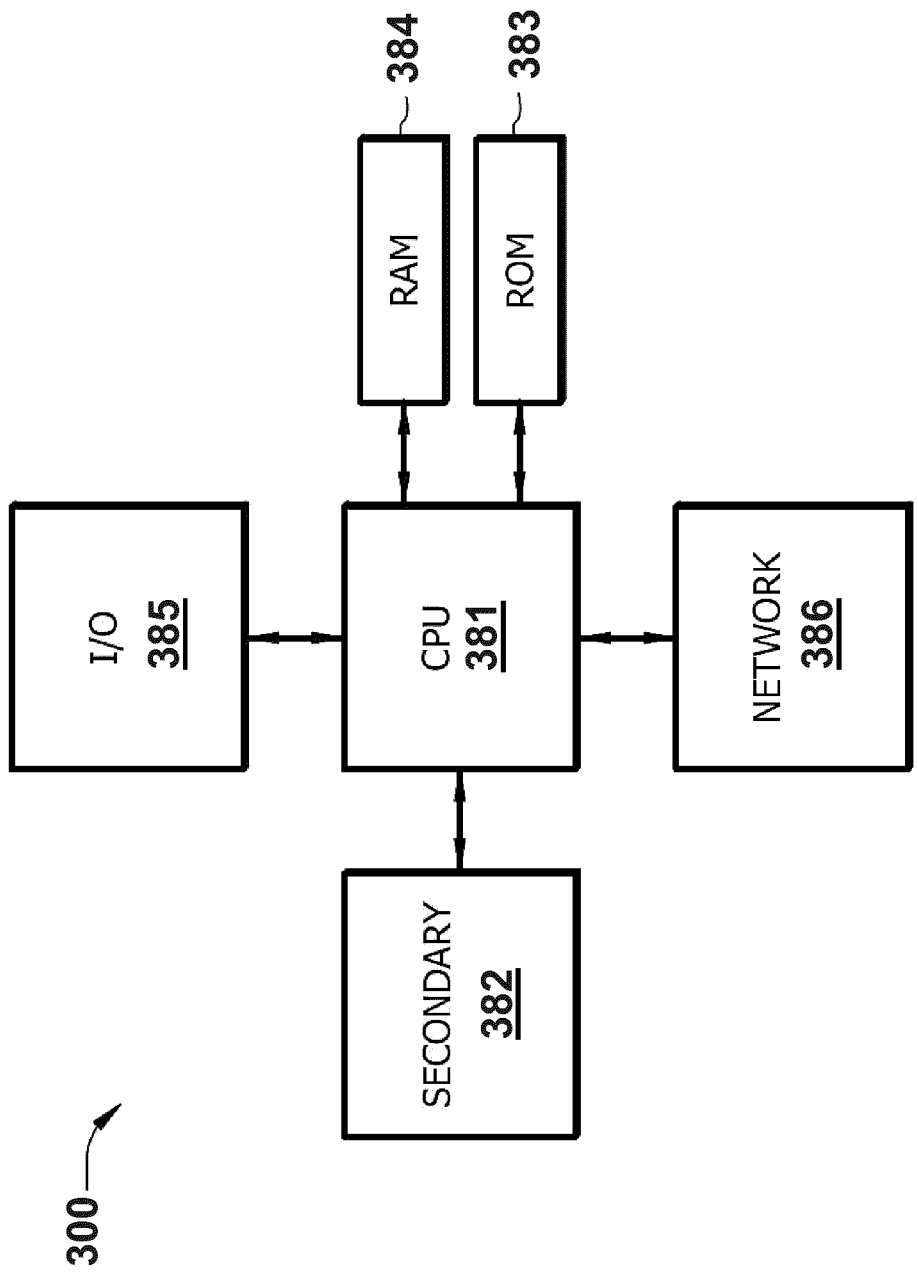
FIG. 9 illustrates an exemplary computer system according to some embodiments.

Any of the systems and methods disclosed herein can be carried out on a computer or other device comprising a processor (e.g., a desktop computer, a laptop computer, a tablet, a server, a smartphone, or some combination thereof). FIG. 9 illustrates a computer system 300 suitable for implementing one or more embodiments disclosed herein such as the acquisition device or any portion thereof. The computer system 300 includes a processor 381 (which may be referred to as a central processor unit or CPU) that is in communication with memory devices including secondary storage 382, read only memory (ROM) 383, random access memory (RAM) 384, input/output (I/O) devices 385, and network connectivity devices 386. The processor 381 may be implemented as one or more CPU chips.

It is understood that by programming and/or loading executable instructions onto the computer system 300, at least one of the CPU 381, the RAM 384, and the ROM 383 are changed, transforming the computer system 300 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 300 is turned on or booted, the CPU 381 may execute a computer program or application. For example, the CPU 381 may execute software or firmware stored in the ROM 383 or stored in the RAM 384. In some cases, on boot and/or when the application is initiated, the CPU 381 may copy the application or portions of the application from the secondary storage 382 to the RAM 384 or to memory space within the CPU 381 itself, and the CPU 381 may then execute instructions of which the application is comprised. In some cases, the CPU 381 may copy the application or portions of the application from memory accessed via the network connectivity devices 386 or via the I/O devices 385 to the RAM 384 or to memory space within the CPU 381, and the CPU 381 may then execute instructions of which the application is comprised. During execution, an application may load instructions into the CPU 381, for example load some of the instructions of the application into a cache of the CPU 381. In some contexts, an application that is executed may be said to configure the CPU 381 to do something, e.g., to configure the CPU 381 to perform the function or functions promoted by the subject application. When the CPU 381 is configured in this way by the application, the CPU 381 becomes a specific purpose computer or a specific purpose machine.

The secondary storage 382 is typically comprised of one or more disk drives or tape drives and is used for non-volatile storage of data and as an over-flow data storage device if RAM 384 is not large enough to hold all working data. Secondary storage 382 may be used to store programs which are loaded into RAM 384 when such programs are selected for execution. The ROM 383 is used to store instructions and perhaps data which are read during program execution. ROM 383 is a non-volatile memory device which typically has a small memory capacity relative to the larger memory capacity of secondary storage 382. The RAM 384 is used to store volatile data and perhaps to store instructions. Access to both ROM 383 and RAM 384 is typically faster than to secondary storage 382. The secondary storage 382, the RAM 384, and/or the ROM 383 may be referred to in some contexts as computer readable storage media and/or non-transitory computer readable media.

I/O devices 385 may include printers, video monitors, electronic displays (e.g., liquid crystal displays (LCDs), plasma displays, organic light emitting diode displays (OLED), touch sensitive displays, etc.), keyboards, keypads, switches, dials, mice, track balls, voice recognizers, card readers, paper tape readers, or other well-known input devices.

The network connectivity devices 386 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 386 may enable the processor 381 to communicate with the Internet or one or more intranets. With such a network connection, it is contemplated that the processor 381 might receive information from the network, or might output information to the network (e.g., to an event database) in the course of performing the above-described method steps. Such information, which is often represented as a sequence of instructions to be executed using processor 381, may be received from and outputted to the network, for example, in the form of a computer data signal embodied in a carrier wave.

Such information, which may include data or instructions to be executed using processor 381 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several known methods. The baseband signal and/or signal embedded in the carrier wave may be referred to in some contexts as a transitory signal.

The processor 381 executes instructions, codes, computer programs, scripts which it accesses from hard disk, floppy disk, optical disk (these various disk based systems may all be considered secondary storage 382), flash drive, ROM 383, RAM 384, or the network connectivity devices 386. While only one processor 381 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 382, for example, hard drives, floppy disks, optical disks, and/or other device, the ROM 383, and/or the RAM 384 may be referred to in some contexts as non-transitory instructions and/or non-transitory information.

In an embodiment, the computer system 300 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 300 to provide the functionality of a number of servers that is not directly bound to the number of computers in the computer system 300. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 300, at least portions of the contents of the computer program product to the secondary storage 382, to the ROM 383, to the RAM 384, and/or to other non-volatile memory and volatile memory of the computer system 300. The processor 381 may process the executable instructions and/or data structures in part by directly accessing the computer program product, for example by reading from a CD-ROM disk inserted into a disk drive peripheral of the computer system 300. Alternatively, the processor 381 may process the executable instructions and/or data structures by remotely accessing the computer program product, for example by downloading the executable instructions and/or data structures from a remote server through the network connectivity devices 386. The computer program product may comprise instructions that promote the loading and/or copying of data, data structures, files, and/or executable instructions to the secondary storage 382, to the ROM 383, to the RAM 384, and/or to other non-volatile memory and volatile memory of the computer system 300.

In some contexts, the secondary storage 382, the ROM 383, and the RAM 384 may be referred to as a non-transitory computer readable medium or a computer readable storage media. A dynamic RAM embodiment of the RAM 384, likewise, may be referred to as a non-transitory computer readable medium in that while the dynamic RAM receives electrical power and is operated in accordance with its design, for example during a period of time during which the computer system 300 is turned on and operational, the dynamic RAM stores information that is written to it. Similarly, the processor 381 may comprise an internal RAM, an internal ROM, a cache memory, and/or other internal non-transitory storage blocks, sections, or components that may be referred to in some contexts as non-transitory computer readable media or computer readable storage media.

Having described various systems and methods herein, specific aspects can include, but are not limited to:

In a first aspect, a method of presenting sensor data comprises: receiving, with a server, a request for data to be displayed on a display area of a display device, wherein the request comprises a pixel resolution of the display area, a first output range of the data along a first axis, and a second output range of the data along a second axis; determining a data distribution per pixel within the display area for both the first axis and the second axis based on the pixel resolution, the first output range, and the second output range; fitting, with the server, the data distribution per pixel for data associated with the first axis to provide first axis fitted data; fitting, with the server, the data distribution per pixel for data associated with the second axis to provide second axis fitted data; and sending, from the server to the display device, the first axis fitted data and the second axis fitted data.

A second aspect can include the method of the first aspect, wherein fitting the data distribution per pixel for data associated with the first axis comprises performing a non-linear data fit for the data subset per pixel for data associated with the first axis.

A third aspect can include the method of the first or second aspect, wherein fitting the data distribution per pixel for data associated with the second axis comprises performing a non-linear data fit for the data subset per pixel for data associated with the second axis.

A fourth aspect can include the method of the second or third aspect, wherein the non-linear data fit comprises a polynomial fit.

A fifth aspect can include the method of any one of the first to fourth aspects, further comprising: determining a communication bandwidth between the server and the display device; grouping adjacent pixels into pixel groups; and combining the first axis fitted data and the second axis fitted data within the pixel group based on the communication bandwidth.

A sixth aspect can include the method of any one of the first to fourth aspects, wherein the request includes a maximum latency period; and wherein the method further comprises: determining a communication latency time between the server and the display device; combining adjacent pixels within the display area to produce adjusted first axis fitted data and adjusted second axis fitted data, wherein the adjusted first axis fitted data and the adjusted second axis fitted data have a second pixel resolution that is lower than the pixel resolution; and sending, from the server to the display device, the adjusted first axis fitted data and the adjusted second axis fitted data.

A seventh aspect can include the method of any one of the first to sixth aspects, wherein the first axis comprises a depth of a subterranean wellbore, wherein the second axis comprises time, and wherein the data fitted into the first output range and the second output range comprises an output signal derived from a fiber optic sensor within the subterranean wellbore or a statistical features of the output signal.

An eighth aspect can include the method of the seventh aspect, wherein the output signal comprises a distributed acoustic signal, and wherein the statistical features comprise frequency domain features of the output signal.

A ninth aspect can include the method of the seventh aspect, wherein the output signal comprises a distributed temperature signal.

A tenth aspect can include the method of any one of the first to ninth aspects, wherein the first axis and the second axis form a first plot within the display area, and wherein the method further comprises: receiving an indication of a selection of a first sub-set of the first output range; determining a first average of the first sub-set along the second output range; outputting the first average from the server to the display device as a second plot within the display area that is positioned along a first side of the first plot.

An eleventh aspect can include the method of the tenth aspect, further comprising: receiving an indication of a selection of a second sub-set of the second output range; determining a second average of the second sub-set along the first sub-set of the first output range; and outputting the second average from the server to the display device as a third plot within the display area that is positioned along a second side of the first plot.

A twelfth aspect can include the method of the eleventh aspect, wherein the second sub-set and the first sub-set have different magnitudes.

A thirteenth aspect can include the method of any one of the tenth to twelfth aspects, further comprising outputting a fourth plot from the sever to the display device that is adjacent the second plot and that presents static data relative to and along the second output range of the second axis, wherein the second static data is not time-variable.

In a fourteenth aspect, a system for presenting sensor data on a display device comprises: a processor; a memory communicatively coupled to the processor; and an analysis program stored in the memory, wherein the analysis program is configured, when executed on the processor, to: receive a request for data to be displayed on a display area of the display device, wherein the request comprises a pixel resolution of the display area, a first output range of the data along a first axis, and a second output range of the data along a second axis; determine a data distribution per pixel within the display area for both the first axis and the second axis based on the pixel resolution, the first output range, and the second output range; fit the data distribution per pixel for data associated with the first axis to provide first axis fitted data; fit the data distribution per pixel for data associated with the second axis to provide second axis fitted data; and send the first axis fitted data and the second axis fitted data to the display device.

A fifteenth aspect can include the system of the fourteenth aspect, wherein the analysis program, when executed on the processor, is configured to fit the data distribution per pixel for data associated with the first axis using a non-linear data fit.

A sixteenth aspect can include the system of the fourteenth or fifteenth aspect, wherein the analysis program, when executed on the processor, is configured to fit the data distribution per pixel for data associated with the second axis using a non-linear data fit.

A seventeenth aspect can include the system of the fifteenth or sixteenth aspect, wherein the non-linear data fit comprises a polynomial fit.

An eighteenth aspect can include the system of any one of the fourteenth or seventeenth aspects, wherein the analysis program, when executed on the processor is further configured to: determine a communication bandwidth between the processor and the display device; group adjacent pixels into pixel groups; and combine the first axis fitted data and the second axis fitted data within the pixel group based on the communication bandwidth.

A nineteenth aspect can include the system of any one of the fourteenth to seventeenth aspects, wherein the request includes a maximum latency period; and wherein the analysis program, when executed on the processor, is further configured to: determine a communication latency time between the processor and the display device; combine adjacent pixels within the display area to produce adjusted first axis fitted data and adjusted second axis fitted data, wherein the adjusted first axis fitted data and the adjusted second axis fitted data have a second pixel resolution that is lower than the pixel resolution; and send the adjusted first axis fitted data and the adjusted second axis fitted data to the display device.

A twentieth aspect can include the system of any one of the fourteenth to nineteenth aspects, wherein the first axis comprises a depth of a subterranean wellbore, wherein the second axis comprises time, and wherein the data fitted into the first output range and the second output range comprises an output signal derived from a fiber optic sensor within the subterranean wellbore or a statistical features of the output signal.

A twenty first aspect can include the system of the twentieth aspect, wherein the output signal comprises a distributed acoustic signal, and wherein the statistical features comprise frequency domain features of the output signal.

A twenty second aspect can include the system of the twentieth aspect, wherein the output signal comprises a distributed temperature signal.

A twenty third aspect can include the system of any one of the fourteenth to twenty second aspects, wherein the first axis and the second axis form a first plot within the display area, and wherein the analysis program, when executed on the processor, is further configured to: receive an indication of a selection of a first sub-set of the first output range; determine a first average of the first sub-set along the second output range; and output the first average to the display device as a second plot within the display area that is positioned along a first side of the first plot.

A twenty fourth aspect can include the system of the twenty third aspect, wherein the analysis program, when executed on the processor, is further configured to: receive an indication of a selection of a second sub-set of the second output range; determine a second average of the second sub-set along the first sub-set of the first output range; and output the second average to the display device as a third plot within the display area that is positioned along a second side of the first plot.

A twenty fifth aspect can include the system of the twenty fourth aspect, wherein the second sub-set and the first sub-set have different magnitudes.

A twenty sixth aspect can include the system of any one of the twenty third to twenty fifth aspects, wherein the analysis program, when executed on the processor, is further configured to output a fourth plot to the display device that is adjacent the second plot and that presents static data relative to and along the second output range of the second axis, wherein the second static data is not time-variable.

In a twenty seventh aspect, a method of presenting sensor data comprises: receiving, with a server, a request to display time-variable data on a plot presented on a display device, wherein the request comprises a first pixel resolution of the display device, an identification of the data to be displayed along an axis of the plot, and an output range of the data along the axis; determining a data distribution per pixel within the plot for the axis based on the first pixel resolution and the output range; fitting, with the server, the data distribution per pixel along the axis to provide fitted data; determining a communication bandwidth between the server and the display device; combining adjacent pixels within the plot to produce adjusted fitted data along the axis based on the communication bandwidth, wherein the adjusted fitted data has a second pixel resolution that is lower than the first pixel resolution; and sending, from the server to a display device, the adjusted fitted data at the second pixel resolution.

A twenty eighth aspect can include the method of the twenty seventh aspect, wherein the request comprises a maximum communication latency time between the server and the display device; and wherein the method further comprises: determining a communication latency time between the server and the display device based on the communication bandwidth; and determining that the communication latency time is longer than the maximum communication latency time; and wherein combining the adjacent pixels within the plot to produce the adjusted fitted data along the axis comprises combining adjacent pixels within the plot to produce the adjusted fitted data in response to determining that the communication latency time is longer than the maximum communication latency time.

A twenty ninth aspect can include the method of the twenty seventh or twenty eighth aspect, wherein fitting the data distribution per pixel along the axis comprises performing a non-linear data fit for the data distribution per pixel along the axis.

A thirtieth aspect can include the method of the twenty ninth aspect, wherein the non-linear data fit comprises a polynomial fit.

A thirty first aspect can include the method of any one of the twenty seventh to thirtieth aspects, further comprising: receiving an indication of a selection of a sub-set of the output range of the data along the axis; determining an average of the sub-set along a second output range of a second axis of the plot, wherein the second axis is orthogonal to the axis; and outputting the average of the sub-set along the second output range of the second axis to the display device as a second plot that is positioned along a first side of the plot.

A thirty second aspect can include the method of the thirty first aspect, further comprising: receiving an indication of a selection of a second sub-set of the second range along the second axis; determining a second average of the second sub-set along the first sub-set of the first range; and outputting the second average from the server to the display device as a third plot on the display area that is positioned along a second side of the plot.

A thirty third aspect can include the method of the thirty second aspect, wherein the second sub-set and the first sub-set have different magnitudes.

A thirty fourth aspect can include the method of any one of the thirty first to thirty third aspects, further comprising outputting a fourth plot from the sever to the display device that is adjacent the second plot and that presents static data relative to and along the second output range of the second axis, wherein the second static data is not time-variable.

In a thirty fifth aspect, a system for presenting sensor data comprises: a processor; a memory communicatively coupled to the processor; and analysis program stored in the memory, wherein the analysis program is configured, when executed on the processor, to: receive a request to display time-variable data on a plot presented on a display device, wherein the request comprises a first pixel resolution of the display device, an identification of the data to be displayed along an axis of the plot, and an output range of the data along the axis; determine a data distribution per pixel within the plot for the axis based on the first pixel resolution and the output range; fit the data distribution per pixel along the axis to provide fitted data; determine a communication bandwidth between the processor and the display device; combine adjacent pixels within the plot to produce adjusted fitted data along the axis based on the communication bandwidth, wherein the adjusted fitted data has a second pixel resolution that is lower than the first pixel resolution; and send the adjusted fitted data at the second pixel resolution to the display device.

A thirty sixth aspect can include the system of the thirty fifth aspect, wherein the request comprises a maximum communication latency time between the server and the display device; and wherein the analysis program, when executed on the processor, is configured to: determine a communication latency time between the processor and the display device based on the communication bandwidth; and determine that the communication latency time is longer than the maximum communication latency time; and wherein the analysis program, when executed on the processor, is configured to combine the adjacent pixels within the plot to produce the adjusted fitted data along the axis by combining adjacent pixels within the plot to produce the adjusted fitted data in response to determining that the communication latency time is longer than the maximum communication latency time.

A thirty seventh aspect can include the system of the thirty fifth or thirty sixth aspect, wherein the analysis program, when executed on the processor, is configured to fit the data distribution per pixel along the axis using a non-linear data fit.

A thirty eighth aspect can include the system of the thirty seventh aspect, wherein the non-linear data fit comprises a polynomial fit.

A thirty ninth aspect can include the system of any one of the thirty fifth to thirty eighth aspects, wherein the analysis program, when executed on the processor, is further configured to: receive an indication of a selection of a sub-set of the output range of the data along the axis; determine an average of the sub-set along a second output range of a second axis of the plot, wherein the second axis is orthogonal to the axis; and output the average of the sub-set along the second output range of the second axis to the display device as a second plot that is positioned along a first side of the plot.

A fortieth aspect can include the system of the thirty ninth aspect, wherein the analysis program, when executed on the processor, is further configured to: receive an indication of a selection of a second sub-set of the second range along the second axis; determine a second average of the second sub-set along the first sub-set of the first range; and output the second average from the server to the display device as a third plot on the display area that is positioned along a second side of the plot.

A forty first aspect can include the system of the fortieth aspect, wherein the second sub-set and the first sub-set have different magnitudes.

A forty second aspect can include the system of any one of the thirty fifth to forty first aspects, wherein the analysis program, when executed on the processor, is further configured to output a fourth plot to the display device that is adjacent the second plot and that presents static data relative to and along the second output range of the second axis, wherein the second static data is not time-variable.

In a forty third aspect, a method for identifying an event comprises: providing sensor data; wherein the sensor data comprises measurements correlated with at least one of location or time, determining a first range for at least one of the location or the time; determining a first value of the measurements over the first range for at least one of the location or the time; determining a second range for at least one of the location or time; determining a second value of the measurements over the second range for at least one of the location or the time; determining a difference between the first value and the second value; and identifying an event for at the at least one of the location or the time using the difference.

A forty fourth aspect can include the method of the thirty third aspect, wherein the first value and the second value comprise at least one of an average of the measurements, a maximum value of the measurements, a standard deviation of the measurements, or a median value of the measurements over the first range and the second range, respectively, for at least one of the location or the time.

A forty fifth aspect can include the method of the thirty third or forty fourth aspect, wherein the first range is selected to represent at least one of the location or the time during which the event is not occurring, and wherein the second range is selected to represent at least one of the location or the time during which the event is occurring, and wherein the difference between the first value and the second value represents an indication of the value of the measurements due to the event.

A forty sixth aspect can include the method of any one of the forty third or forty fifth aspects, further comprising: providing the sensor data to a display device from a server for presentation on a first plot positioned within a display area of the display device, wherein the first plot has a first axis and a second axis that is orthogonal to the first axis, and wherein the sensor data has a first viewing range along the first axis and a second viewing range along the second axis; receiving an indication of a first selection of data in the first viewing range along the first axis corresponding to the first range; determining the first value of the measurements of the first selection along the second viewing range of the second axis; and outputting the first value of the measurements from the server to the display device as a second plot on the display area that is positioned along a first side of the first plot.

A forty seventh aspect can include the method of the forty sixth aspect, further comprising: receiving an indication of a second selection of data in the second viewing range along the second axis; determining a third value of the measurements of the second selection along the first viewing range of the first axis; and outputting the third value of the measurements from the server to the display device as a third plot on the display area that is positioned along a second side of the first plot.

A forty eighth aspect can include the method of the forty seventh aspect, wherein the second selection and the first selection have different magnitudes.

A forty ninth aspect can include the method of the forty seventh or forty eighth aspect, wherein the first side of the first plot extends parallel to the second axis, and wherein the second side of the first plot extends parallel to the first axis.

A fiftieth aspect can include the method of any one of the forty seventh to forty ninth aspects, further comprising: identifying one or more events in an environment associated with the sensor data based on the presentation of the first plot, the second plot, and the third plot.

A fifty first aspect can include the method of any one of the forty seventh to fiftieth aspects, further comprising: receiving, with the server, a request for the sensor data to be displayed on the plot, wherein the request comprises a first pixel resolution of the plot, the first range, and the second range; determining a data distribution per pixel within the plot for both the first axis and the second axis based on the first pixel resolution, the first range, and the second range; fitting, with the server, the data distribution per pixel for data associated with the first axis to provide first axis fitted data; fitting, with the server, the data distribution per pixel for data associated with the second axis to provide second axis fitted data; and sending, from the server to the display device, the first axis fitted data and the second axis fitted data to be presented on the plot.

A fifty second aspect can include the method of the fifty first aspect, wherein fitting the data distribution per pixel for data associated with the first axis comprises performing a non-linear data fit for the data distribution per pixel for data associated with the first axis.

A fifty third aspect can include the method of the fifty first or fifty second aspect, wherein fitting the data subset per pixel for data associated with the second axis comprises performing a non-linear data fit for the data distribution per pixel for data associated with the second axis.

A fifty fourth aspect can include the method of the fifty second or fifty third aspect, wherein the non-linear data fit comprises a polynomial fit.

A fifty fifth aspect can include the method of any one of the fifty first to fifty fourth aspects, further comprising: determining a communication bandwidth between the server and the display device; combining adjacent pixels within the plot to produce a first adjusted fitted data along the first axis and a second adjusted fitted data along the second axis based on the communication bandwidth, wherein the adjusted fitted data has a second pixel resolution that is lower than the first pixel resolution; and sending, from the server to a display device, the adjusted fitted data at the second pixel resolution.

In a fifty sixth aspect, a system comprises: a processor; a memory communicatively coupled to the processor; and an analysis program stored in the memory, wherein the analysis program is configured, when executed on the processor, to: provide sensor data, wherein the sensor data comprises measurements correlated with at least one of location or time, determine a first range for at least one of the location or the time; determine a first value of the measurements over the first range for at least one of the location or the time; determine a second range for at least one of the location or time; determine a second value of the measurements over the second range for at least one of the location or the time; determine a difference between the first value and the second value; and identify an event for at the at least one of the location or the time using the difference.

A fifty seventh aspect can include the system of the fifty sixth aspect, wherein the first value and the second value comprise at least one of an average of the measurements, a maximum value of the measurements, a standard deviation of the measurements, or a median value of the measurements over the first range and the second range, respectively, for at least one of the location or the time.

A fifty eighth aspect can include the system of the fifty sixth or fifty seventh aspect, wherein the first range is selected to represent at least one of the location or the time during which the event is not occurring, and wherein the second range is selected to represent at least one of the location or the time during which the event is occurring, and wherein the difference between the first value and the second value represents an indication of the value of the measurements due to the event.

A fifty ninth aspect can include the system of any one of the fifty sixth to fifty eighth aspects, wherein the analysis program is configured, when executed on the processor, to: provide the sensor data to a display device for presentation on a first plot positioned within a display area of the display device, wherein the first plot has a first axis and a second axis that is orthogonal to the first axis, and wherein the sensor data has a first viewing range along the first axis and a second viewing range along the second axis; receive an indication of a first selection of data in the first viewing range along the first axis corresponding to the first range; determine the first value of the measurements of the first selection along the second viewing range of the second axis; and output the first value of the measurements to the display device as a second plot on the display area that is positioned along a first side of the first plot.

A sixtieth aspect can include the system of the fifty ninth aspect, wherein the analysis program, when executed by the processor, is further configured to: receive an indication of a second selection of data in the second viewing range along the second axis; determine a third value of the measurements of the second selection along the first viewing range of the first axis; and output the third value of the measurements to the display device as a third plot on the display area that is positioned along a second side of the first plot.

A sixty first aspect can include the system of the sixtieth aspect, wherein the second selection and the first selection have different magnitudes.

A sixty second aspect can include the system of the sixtieth or sixty first aspect, wherein the first side of the first plot extends parallel to the second axis, and wherein the second side of the first plot extends parallel to the first axis.

A sixty third aspect can include the system of any one of the fifty sixth to sixty second aspects, wherein the analysis program, when executed on the processor, is further configured to: receive a request for the sensor data to be displayed on the plot, wherein the request comprises a first pixel resolution of the plot, the first range, and the second range; determine a data distribution per pixel within the plot for both the first axis and the second axis based on the first pixel resolution, the first range, and the second range; fit the data distribution per pixel for data associated with the first axis to provide first axis fitted data; fit the data distribution per pixel for data associated with the second axis to provide second axis fitted data; and send the first axis fitted data and the second axis fitted data to the display device to be presented on the plot.

A sixty fourth aspect can include the system of the sixty third aspect, wherein the analysis program, when executed on the processor, is configured to fit the data distribution per pixel for data associated with the first axis with a non-linear data fit.

A sixty fifth aspect can include the system of the sixty third or sixty fourth aspect, wherein the analysis program, when executed on the processor, is configured to fit the data distribution per pixel for data associated with the second axis with a non-linear data fit.

A sixty sixth aspect can include the system of the sixty fourth or sixty fifth aspect, wherein the non-linear data fit comprises a polynomial fit.

A sixty seventh aspect can include the system of any one of the sixty second to sixty sixth aspects, wherein the analysis program, when executed on the processor, is further configured to: determine a communication bandwidth between the processor and the display device; combine adjacent pixels within the plot to produce a first adjusted fitted data along the first axis and a second adjusted fitted data along the second axis based on the communication bandwidth, wherein the adjusted fitted data has a second pixel resolution that is lower than the first pixel resolution; and send the adjusted fitted data at the second pixel resolution to the display device.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of presenting sensor data, the method comprising:
   receiving, with a server, a request for data to be displayed on a display area of a display device, wherein the request comprises a pixel resolution of the display area, a first output range of the data along a first axis, and a second output range of the data along a second axis;
   determining a data distribution per pixel within the display area for both the first axis and the second axis based on the pixel resolution, the first output range, and the second output range;
   fitting, with the server, the data distribution per pixel for data associated with the first axis to provide first axis fitted data;
   fitting, with the server, the data distribution per pixel for data associated with the second axis to provide second axis fitted data; and
   sending, from the server to the display device, the first axis fitted data and the second axis fitted data,
   wherein the first axis comprises a depth of a subterranean wellbore, wherein the second axis comprises time, and wherein the data fitted into the first output range and the second output range comprises an output signal derived from a fiber optic sensor within the subterranean wellbore or a statistical features of the output signal.

2. The method of claim 1, wherein fitting the data distribution per pixel for data associated with the first axis comprises performing a non-linear data fit for the data subset per pixel for data associated with the first axis.

3. The method of claim 2, wherein the non-linear data fit comprises a polynomial fit.

4. The method of claim 1, wherein fitting the data distribution per pixel for data associated with the second axis comprises performing a non-linear data fit for the data subset per pixel for data associated with the second axis.

5. The method of claim 1, further comprising:
   determining a communication bandwidth between the server and the display device;
   grouping adjacent pixels into pixel groups; and
   combining the first axis fitted data and the second axis fitted data within the pixel group based on the communication bandwidth.

6. The method of claim 1, wherein the request includes a maximum latency period; and
   wherein the method further comprises:
      determining a communication latency time between the server and the display device;
      combining adjacent pixels within the display area to produce adjusted first axis fitted data and adjusted second axis fitted data, wherein the adjusted first axis fitted data and the adjusted second axis fitted data have a second pixel resolution that is lower than the pixel resolution; and
      sending, from the server to the display device, the adjusted first axis fitted data and the adjusted second axis fitted data.

7. The method of claim 1, wherein the output signal comprises a distributed acoustic signal, and wherein the statistical features comprise frequency domain features of the output signal.

8. The method of claim 1, wherein the output signal comprises a distributed temperature signal.

9. The method of claim 1, wherein the first axis and the second axis form a first plot within the display area, and wherein the method further comprises:
   receiving an indication of a selection of a first sub-set of the first output range;
   determining a first average of the first sub-set along the second output range;
   outputting the first average from the server to the display device as a second plot within the display area that is positioned along a first side of the first plot.

10. The method of claim 9, further comprising:
    receiving an indication of a selection of a second sub-set of the second output range;
    determining a second average of the second sub-set along the first sub-set of the first output range; and
    outputting the second average from the server to the display device as a third plot within the display area that is positioned along a second side of the first plot.

11. The method of claim 10, wherein the second sub-set and the first sub-set have different magnitudes.

12. The method of claim 9, further comprising outputting a fourth plot from the sever to the display device that is adjacent the second plot and that presents static data relative to and along the second output range of the second axis, wherein the second static data is not time-variable.

13. A system for presenting sensor data on a display device, the system comprising:
    a processor;
    a memory communicatively coupled to the processor; and
    an analysis program stored in the memory, wherein the analysis program is configured, when executed on the processor, to:
       receive a request for data to be displayed on a display area of the display device, wherein the request comprises a pixel resolution of the display area, a first output range of the data along a first axis, and a second output range of the data along a second axis;
       determine a data distribution per pixel within the display area for both the first axis and the second axis based on the pixel resolution, the first output range, and the second output range;
       fit the data distribution per pixel for data associated with the first axis to provide first axis fitted data;
       fit the data distribution per pixel for data associated with the second axis to provide second axis fitted data; and
       send the first axis fitted data and the second axis fitted data to the display device,
       wherein the first axis comprises a depth of a subterranean wellbore, wherein the second axis comprises time, and wherein the data fitted into the first output range and the second output range comprises an output signal derived from a fiber optic sensor within the subterranean wellbore or a statistical features of the output signal.

14. The system of claim 13, wherein the analysis program, when executed on the processor, is configured to fit the data distribution per pixel for data associated with the first axis using a non-linear data fit.

15. The system of claim 14, wherein the non-linear data fit comprises a polynomial fit.

16. The system of claim 13, wherein the analysis program, when executed on the processor, is configured to fit the data distribution per pixel for data associated with the second axis using a non-linear data fit.

17. The system of claim 13, wherein the analysis program, when executed on the processor is further configured to:
  determine a communication bandwidth between the processor and the display device;
  group adjacent pixels into pixel groups; and
  combine the first axis fitted data and the second axis fitted data within the pixel group based on the communication bandwidth.

18. The system of claim 13, wherein the request includes a maximum latency period; and
  wherein the analysis program, when executed on the processor, is further configured to:
    determine a communication latency time between the processor and the display device;
    combine adjacent pixels within the display area to produce adjusted first axis fitted data and adjusted second axis fitted data, wherein the adjusted first axis fitted data and the adjusted second axis fitted data have a second pixel resolution that is lower than the pixel resolution; and
    send the adjusted first axis fitted data and the adjusted second axis fitted data to the display device.

19. The system of claim 18, wherein the output signal comprises a distributed acoustic signal, and wherein the statistical features comprise frequency domain features of the output signal.

20. The system of claim 18, wherein the output signal comprises a distributed temperature signal.

21. The system of claim 13, wherein the first axis and the second axis form a first plot within the display area, and
  wherein the analysis program, when executed on the processor, is further configured to:
    receive an indication of a selection of a first sub-set of the first output range;
    determine a first average of the first sub-set along the second output range; and
    output the first average to the display device as a second plot within the display area that is positioned along a first side of the first plot.

22. The system of claim 21, wherein the analysis program, when executed on the processor, is further configured to:
  receive an indication of a selection of a second sub-set of the second output range;
  determine a second average of the second sub-set along the first sub-set of the first output range; and
  output the second average to the display device as a third plot within the display area that is positioned along a second side of the first plot.

23. The system of claim 22, wherein the second sub-set and the first sub-set have different magnitudes.

24. The system of claim 21, wherein the analysis program, when executed on the processor, is further configured to output a fourth plot to the display device that is adjacent the second plot and that presents static data relative to and along the second output range of the second axis, wherein the second static data is not time-variable.

* * * * *